(12) United States Patent
Almoneef et al.

(10) Patent No.: US 12,526,134 B2
(45) Date of Patent: Jan. 13, 2026

(54) LIGHTWEIGHT AUTHENTICATION SERVICE, SYSTEM AND METHOD FOR COMPUTING DEVICES AND USER EQUIPMENT

(71) Applicant: Prince Sattam Bin Abdulaziz University (PSAU), Al Kharj (SA)

(72) Inventors: Thamer Almoneef, Al Kharj (SA); Haya Alaskar, Al Kharj (SA); Saqib Amin, Islamabad (PK); Muddassar Farooq, Islamabad (PK)

(73) Assignee: Prince Sattam Bin Abdulaziz University (PSAU), Al Kharj (SA)

( * ) Notice: Subject to any disclaimer, the term of this patent is extended or adjusted under 35 U.S.C. 154(b) by 147 days.

(21) Appl. No.: 18/424,682

(22) Filed: Jan. 26, 2024

(65) Prior Publication Data

US 2025/0247221 A1    Jul. 31, 2025

(51) Int. Cl.
  *H04L 9/08*  (2006.01)
  *H04L 9/40*  (2022.01)
(52) U.S. Cl.
  CPC ............ *H04L 9/0869* (2013.01); *H04L 63/08* (2013.01)
(58) Field of Classification Search
  CPC ... H04L 9/0869; H04L 63/08; H04L 63/0428; H04L 9/085; H04L 9/40
  USPC ....................................................... 713/171
  See application file for complete search history.

(56) References Cited

U.S. PATENT DOCUMENTS

| | | | |
|---|---|---|---|
| 10,824,737 B1* | 11/2020 | Guyomarc'h | H04L 9/0625 |
| 11,418,324 B1* | 8/2022 | Fernandez | H04L 9/0662 |
| 2007/0192474 A1* | 8/2007 | Decasper | H04L 67/306 |
| | | | 709/223 |

(Continued)

OTHER PUBLICATIONS

M. E. Hellman, "An overview of public key cryptography," in IEEE Communications Magazine, vol. 40, No. 5, pp. 42-49, May 2002, doi: 10.1109/MCOM.2002.1006971.*

*Primary Examiner* — Meng Vang
(74) *Attorney, Agent, or Firm* — MUGHAL GAUDRY & FRANKLIN PC

(57) ABSTRACT

This disclosure relates to a lightweight authentication service, system and method that securely authenticates the identity of a secure user equipment (UE) or a device in a communication network system. The service and associated methods work by creating two partial secrets namely a first partial secret and a second partial secret. The first partial secret is generated by the manufacturer or the owner of the UE, which is stored on a secure location on the UE and the second partial secret is stored in a database storage system on a server in a cloud running an authentication service. The encryption of information elements is done by multiplying the information elements with the square of random numbers, the encrypted secrets are randomized and before transmission on the channel. The disclosure also describes a receiver UE that could either request an authentication service, running in a cloud, to authenticate a sender UE. In another example, the receiver UE includes a receiver authentication service module that enables the receiver UE to authenticate a sender UE in a peer to peer manner and a credential core in the cloud is only used as a storage medium to provide a transformed partial secret of a sender UE.

21 Claims, 19 Drawing Sheets

(56) References Cited

U.S. PATENT DOCUMENTS

| | | | |
|---|---|---|---|
| 2008/0285753 A1* | 11/2008 | Li | H04B 10/2581 |
| | | | 380/256 |
| 2008/0298579 A1* | 12/2008 | Abu-Amara | H04L 63/061 |
| | | | 380/30 |
| 2013/0179995 A1* | 7/2013 | Basile | G06F 21/10 |
| | | | 726/32 |
| 2015/0110270 A1* | 4/2015 | Agrawal | H04L 63/0428 |
| | | | 380/247 |
| 2017/0070495 A1* | 3/2017 | Cherry | H04L 63/0428 |
| 2018/0270205 A1* | 9/2018 | Jiang | H04L 63/0428 |
| 2020/0076624 A1* | 3/2020 | Cambou | H04L 9/0643 |
| 2021/0391983 A1* | 12/2021 | Will | H04L 9/3066 |
| 2023/0316275 A1* | 10/2023 | Rule | G06Q 30/06 |
| | | | 705/65 |

* cited by examiner

LIGHTWEIGHT AUTHENTICATION SERVICE, SYSTEM AND METHOD FOR COMPUTING DEVICES AND USER EQUIPMENT

BACKGROUND

The rapid advancement in communication technologies—especially advancements in 5G/6G communication systems—has led to an increased usage of wireless devices, including but not limited to mobile/smart phones, IoT devices, RFID chips and smart dust systems enabling smart industries, smart healthcare, and fintech systems. The wireless devices are now increasingly used to access sensitive information and critical resources in the next generation of online information and/or computing systems. Therefore, secure authentication of devices is becoming significantly important.

The background description provided here is for the purpose of generally presenting the context of the disclosure. Unless otherwise indicated here, the material described in this section is not a prior art to the claims in this application and are not admitted to be prior art by inclusion in this section.

BRIEF DESCRIPTION OF THE DRAWINGS

At least one example may be understood more fully from detailed description given below and from accompanying drawings, which, however, should not be taken to be limiting, but are for explanation and understanding. The accompanying drawings, which are incorporated in and constitute part of this specification, illustrate examples of the invention and, together with the description, explain the principles of the invention. The disclosed systems and methods use a combination of public keys and partial secrets. Furthermore, the examples illustrated herein are presently preferred, it being understood by those skilled in the art, however, the invention is not limited to the precise arrangements and instrumentalities illustrated.

DETAILED DESCRIPTION

Figure 1:
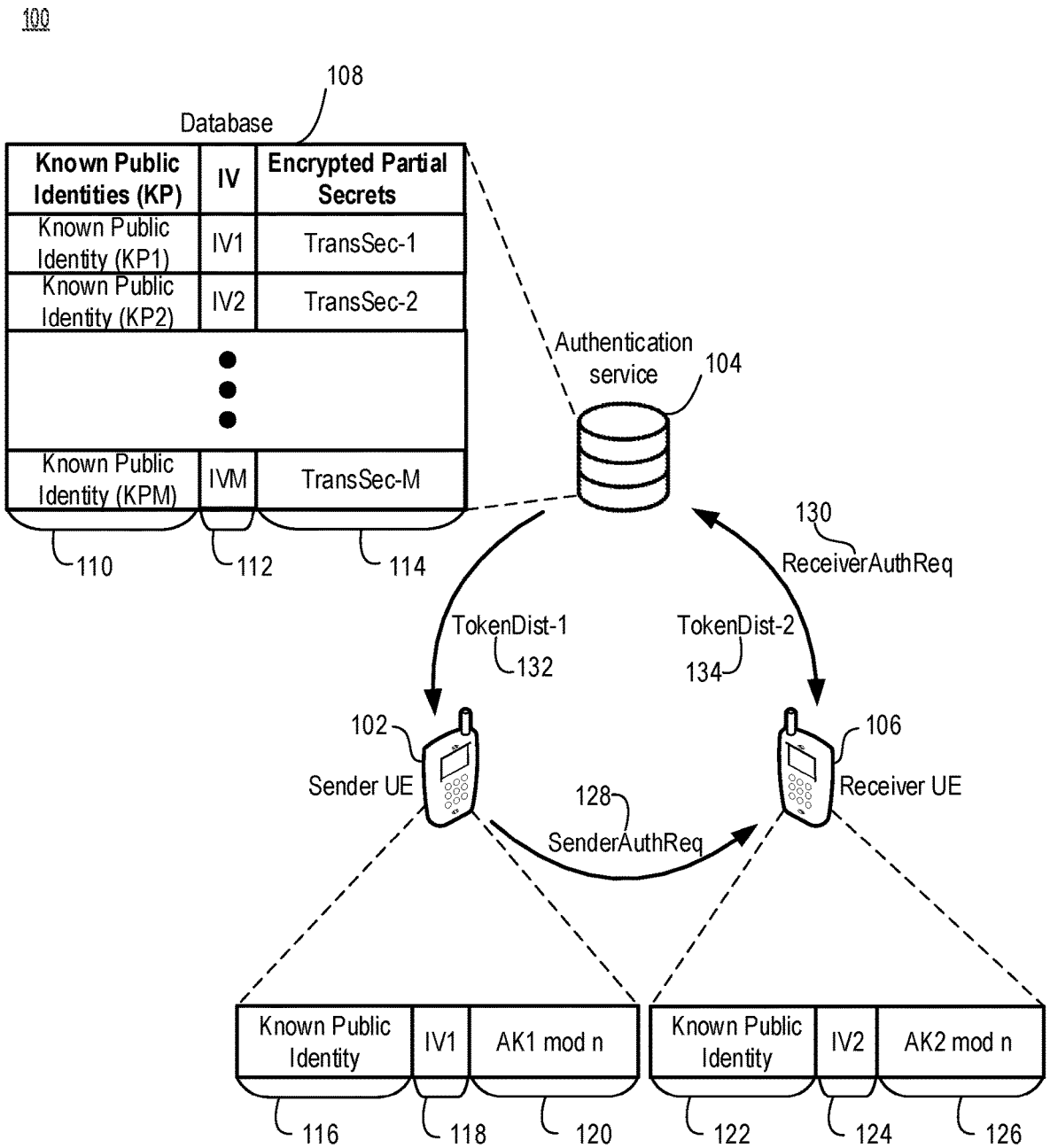
FIG. 1 is a schematic that illustrates a system level diagram of an authentication system and protocol between a sender UE and a receiver UE using an authentication service, in accordance with at least one example.

The following glossary of symbols is used herein.

TABLE 1

| | |
|---|---|
| n | A composite number for a modulus n based numbering system |
| IV | An initialization vector for a randomizer module |
| AK | A partial secret stored in the secure enclave of a UE |
| KP | The Known public identity of a UE |
| TransSec | Encrypted partial secrets |
| US module | User side module |
| SS module | Server side module |
| SIPO | Serial in parallel out register |
| KPS | A Known public identity of a sender UE |
| KPR | A Known public identity of a receiver UE |
| UE | User equipment |
| QR | Quadratic residue |
| AK1 mod n | A first partial secret of a sender UE |
| AK2 mod n | A first partial secret of a receiver UE |

TABLE 1-continued

| | |
|---|---|
| VK1 mod n | A second partial secret of a sender UE |
| VK2 mod n | A second partial secret of a receiver UE |
| A | An encrypted first partial secret of a sender UE |
| B | An encrypted first partial secret of a receiver UE |
| G | An encrypted second partial secret of a sender UE |
| H | An encrypted second partial secret of a receiver UE |
| {X, Y} | Represents concatenation of the two information elements X and Y |
| SenderAuthReq | Sender authorization request message |
| ReceiverAuthReq | Receiver authorization request message |
| ServiceAuthReq | Service authorization request message |
| RAuthReq-1 | Unscrambled Receiver authentication service request message |
| RAuthReq-2 | Scrambled Receiver authentication service request message |

An authentication service is an authentication process (and/or a protocol) that allows a network authentication unit to authenticate the device identifier (device ID) or identity of a wireless/wired device before allowing it to access the services that are subscribed by a user of the device. This authentication process ensures that the users on authorized devices are granted access to an information and associated transaction processing system, its services, and resources.

In this disclosure, device authentication covers both device authentication and a user authentication on a device. A precomputed first partial secret can be stored on a device or it may be computed at run time during the device or service activation while conducting business transactions. Similarly, a UE refers to a communication device, computing device, IoT/wireless device, RFID, USB, and all similar devices that may be used as end points in network transactions or communications.

The internet of things (IoT) refers to the network of devices integrated with sensors, actuators, and software, connecting devices over the internet for exchanging data. The rapid deployment of IoT systems in smart industries, smart buildings and 5G/6G systems has led to an exponential growth in the number of IoT devices deployed. Consequently, a large volume of data is transmitted between IoT devices making the system vulnerable to security attacks/threats by rogue entities. The sensitive data can be compromised over the communication channels or through the impersonation of the IoT devices or their corresponding authentication server.

In this disclosure, at least one example, related to a lightweight authentication system is disclosed for doing secure authentication of UEs. In the disclosed example, a quadratic residue based lightweight encryption method may be used to encrypt the partial secrets of a UE and other information elements. A quadratic residue (QR) is an integer that results from squaring another integer and taking its modulus with a specified number, commonly a composite number that is the product of two large random prime numbers, exhibiting a specific remainder pattern. In this disclosure, access credential or identification of a device information is divided into two partial secrets. The square of random numbers is applied to encrypt both partial secrets in the QR method. In this way, an adversary may not be able to recover the partial secrets because that requires estimating the random numbers from the quadratic residue, which is not computationally feasible to do. The QR based encryption methods work because of the QR property: "one cannot distinguish between a quadratic residue and a non-quadratic residue, except with negligible probability, if the modulus is a composite integer."

The existing authentication systems such as RSA, Diffie-Hellman methods typically use public key cryptography methods, which employ asymmetric cryptography comprising two keys: a public key and a private key. The data is encrypted by a sender UE using the public key of the receiver UE and is decrypted by the receiver UE using its private key. RSA requires taking exponents of very large i.e. 4096-bit numbers that consumes significant power on resource constrained wireless UE devices. Therefore, it is a requirement to have a lightweight power efficient authentication system and method for network systems, comprising wired and wireless UEs, to provide security against unauthorized access by rogue entities. The system and method in this disclosure are not limiting to wireless UEs rather they may be extended to secure all types of computing and communication devices.

The disclosed invention thwarts leakage of users' access credentials vulnerabilities by using partial secrets that are stored in secure locations on a device and in a cloud, which makes stealing of access credentials by malicious entities significantly harder, as they need to by the authentication servers and the UEs. By storing two partial secrets at two separate locations on the device and a server in the cloud, the disclosed invention significantly reduces the risk of a single point of failure in an authentication system. Using the disclosed invention, companies and organizations can significantly harden their authentication systems and protocols, thwarting cyber intrusions even when rogue entities are able to compromise access credentials stored on the storage database systems connected to the authentication servers in the cloud.

In at least one example, a lightweight and secure authentication system may be used by a receiver UE to authenticate a sender UE. The authentication process uses a first partial secret of the sender UE, a first partial secret of the receiver UE, a second partial secret of the sender UE, and a second partial secret of the receiver UE. The authentication service, running on an authentication server in a cloud, maintains a persistent database storage system connected to the authentication server for storing information elements of a plurality of UEs communicating in a network system. The known public identities of the UEs, initialization vectors of randomizer modules of the UEs, and the encrypted second partial secrets of the UEs are concatenated and scrambled before storing into the database storage system.

In at least one example, a manufacturer of a UE may generate the first partial secret of the UE with the help of a partial key generator module. The first partial secret is stored on a secure location inside a secure enclave, and the second partial secret of the UE is stored on the database storage system connected to the authentication server that runs an authentication service.

A true random number generator module or a pseudo random number generator module may generate a plurality of random numbers and a primality test may be applied on the random numbers to determine whether the generated random numbers are prime. If two prime numbers are found, they are multiplied to compute a composite number n, and all computations in the authentication system and method are performed in the modulus n numbering system.

The sender UE authentication module may encrypt the first partial secret using a quadratic residue method, generate one or more information elements for the authentication service, concatenate the information elements to generate a sender authorization request message, scramble this message using a randomizer module, and transmit the message on the communication channel to a receiver UE. The receiver UE applies one or more mathematical operations to encrypt its own first partial secret and generate information elements that are concatenated with the sender UE to generate a receiver authorization request message. The message is scrambled before transmission on the communication channel to the authentication service module running on an authentication server in a cloud. The authentication service module unscrambles the received message and applies different mathematical operations to verify whether the second partial secret of the sender UE stored in the storage database system is a correct mathematical transformation of the first partial secret of the sender UE. If the answer of verification process is yes, then the sender UE is authenticated by the authentication service. Similarly, the authentication service module can verify whether the second partial secret of the receiver UE stored in the storage database system is a correct mathematical transformation of the first partial secret of the receiver UE. If the answer of verification process is yes, then the receiver UE is also authenticated by the authentication. The status of the authentication process is sent in separate tokens to the sender UE and the receiver UE. Once authenticated, both UEs can establish a secure channel to communicate.

In another example, the receiver UE runs the authentication service module itself and the authentication server connected to the database storage system is only used a credential core to request access credentials of the sender UE. The credential core only provides the access credentials of the sender UE to the receiver UE once the credential core authenticates the receiver UE. The receiver UE includes a receiver authentication service module that authenticates the sender UE based on the sender authorization request message and the access credentials of the sender UE that are retrieved from the credential core. The status of the authentication process is sent in a token to the sender UE. Once authenticated, both UEs can establish a secure channel to communicate.

In another example, the authentication service and the credential can also be configured to run in a distributed blockchain system.

In the following description, numerous details are discussed to provide a more thorough explanation of examples of the present disclosure. It will be apparent, however, to one skilled in the art, that examples of the present disclosure may be practiced without these specific details. In other instances, well-known structures and devices are shown in a block diagram form, rather than in detail, to avoid obscuring examples of the present disclosure.

Note that in the corresponding drawings of the examples, information is represented with lines. Some lines may be thicker, to indicate more constituent information paths, and/or have arrows at one or more ends, to indicate primary information flow direction. Such indications are not intended to be limiting. Rather, the lines are used in connection with one or more examples to facilitate easier understanding of a circuit or a logical unit. Any represented signal, as dictated by design requirements or preferences, may actually comprise one or more signals that may travel in either direction, and may be implemented with any suitable type of signal scheme.

It is pointed out that those elements of the figures having the same reference numbers (or names) as the elements of any other figure can operate or function in any manner like that described but are not limited to such.

FIG. 1 is a schematic that illustrates a system level diagram of an authentication system, which includes a sender UE 102, an authentication service module 104, and a receiver UE 106, in accordance with at least one example. The authentication service module 104 may include a database storage system 108 to store known public identities KP of UEs in a first table 110, associated initialization vectors IV of randomizers in a second table 112 and associated encrypted transformed partial secrets of UEs in a third table 114 in the database storage system 108, in accordance with at least one example. The transformed partial secret of a UE is a concatenated output that includes encrypted second partial secret of a UE and associated information elements. In some examples, the database storage system 108 and the authentication server that is running the authentication service module 104 are called a credential core. The sender UE 102 has a known public identity 116, an initialization vector IV1 118 for its randomizers, and a first partial secret AK1 mod n 120. The receiver UE 106 has a known public identity 122, an initialization vector IV2 124 for its randomizers, and a first partial secret AK2 mod n 126. The sender UE 102 sends a scrambled authorization request, SenderAuthReq message 128, to the receiver UE 106 and the receiver UE 106 sends a receiver authorization request, ReceiverAuthReq message 130, to the authentication service module 104. The authentication service module 104 authenticates the receiver UE 104 and the sender UE 102 and generates two scrambled authentication tokens namely TokenDist-1 132 and a TokenDist-2 134 to the sender UE 102 and the receiver UE 106 respectively. All messages sent on a communication channel between the sender UE 102 and the receiver UE 104, during the authentication process, are time stamped to avoid all types of replay attacks. Once the UEs are authenticated, they can establish a secret communication session to securely communicate the information.

Figure 2:
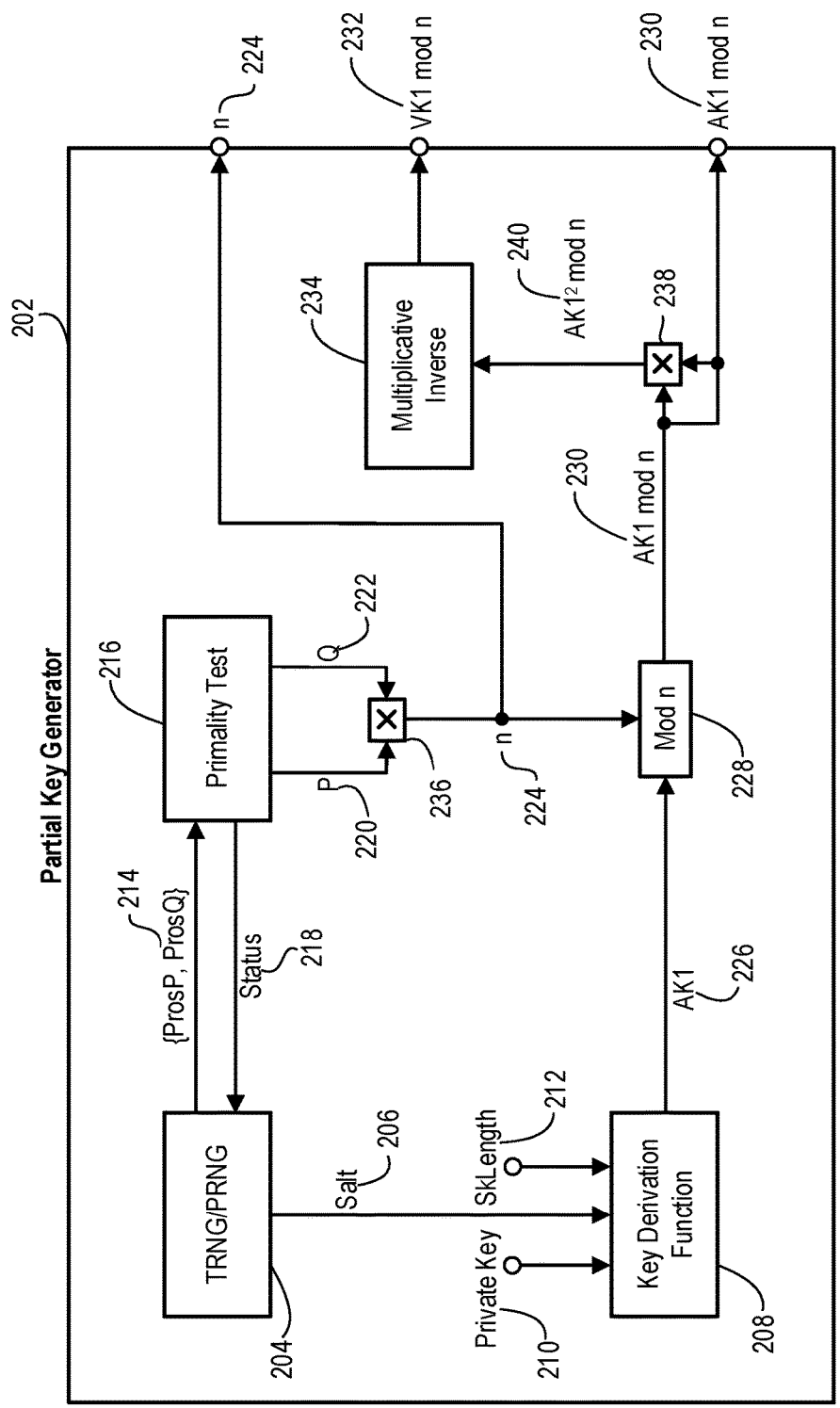
FIG. 2 is a schematic that illustrates an architecture of a partial key generator module that generates two partial secrets for a sender UE, in accordance with at least one example.

FIG. 2 is a schematic that illustrates an architecture of the partial key generator module 202 for generating two partial secrets for the sender UE 102. The first partial secret of the sender UE 102 is stored in a secure enclave on the sender UE 102, whereas the second partial secret is stored in a database storage system 108 on an authentication server or in a credential core to authenticate the sender UE 102, in accordance with at least one example. In at least one example, the partial key generator module 202 may comprise a TRNG/PRNG 204 to generate a salt 206, which is given as an input to a key derivation function 208. The key derivation function 208 also takes as inputs a private key 210 of a sender UE 102 (or a secret key) and the length SkLength 212 of the private key 210. Two prospective random numbers {ProsP, ProsQ} 214 are generated by a TRNG/PRNG module 204 and then given as inputs to a primality test module 216. The primality test module 216 checks if a random number is prime or not and sends a status 218 back to the TRNG/PRNG 204, so that when {ProsP, ProsQ} 214 are prime numbers, it stops generating more numbers; else more sets of integers need to be iteratively generated until they pass the prime number test of the primality test module 216. The outputs of the primality test module 216 are two prime integers P 220 and Q 222. The two prime integers are multiplied by a multiplier 236 to compute a composite number n 224, which provides modulus n numbering system for doing computations in the modulus n numbering system. In at least one example, key derivation function 208, which may be a password based key derivation function, can be used to derive a first partial secret for sender UE 102. The output of the key derivation function 208, AK1 226 is computed in the modulus n numbering system, modulo n module 228, producing AK1 mod n 230 that is the first partial secret of sender UE 102. AK1 mod n 230 is multiplied by itself using a multiplier 238 to compute its square and the output AK12 mod n 240 of the multiplier 238 is given as an input to a multiplicative inverse module 234 that computes its multiplicative inverse VK1 mod n 232, which is the second partial secret of the sender UE.

In at least one example, a partial key generator module 202 may also generate the two partial secrets for the receiver UE 106, in a similar way as described in the example of the partial key generator module 202 of FIG. 2 for the sender UE 102. The first partial secret of the receiver UE, generated by the partial key generator module 202, is AK2 mod n 126, and second partial secret of the receiver UE 106 is VK2 mod n which is the multiplicative inverse of the square of the first partial secret AK2 mod n 126 of the receiver UE 106.

Figure 3:
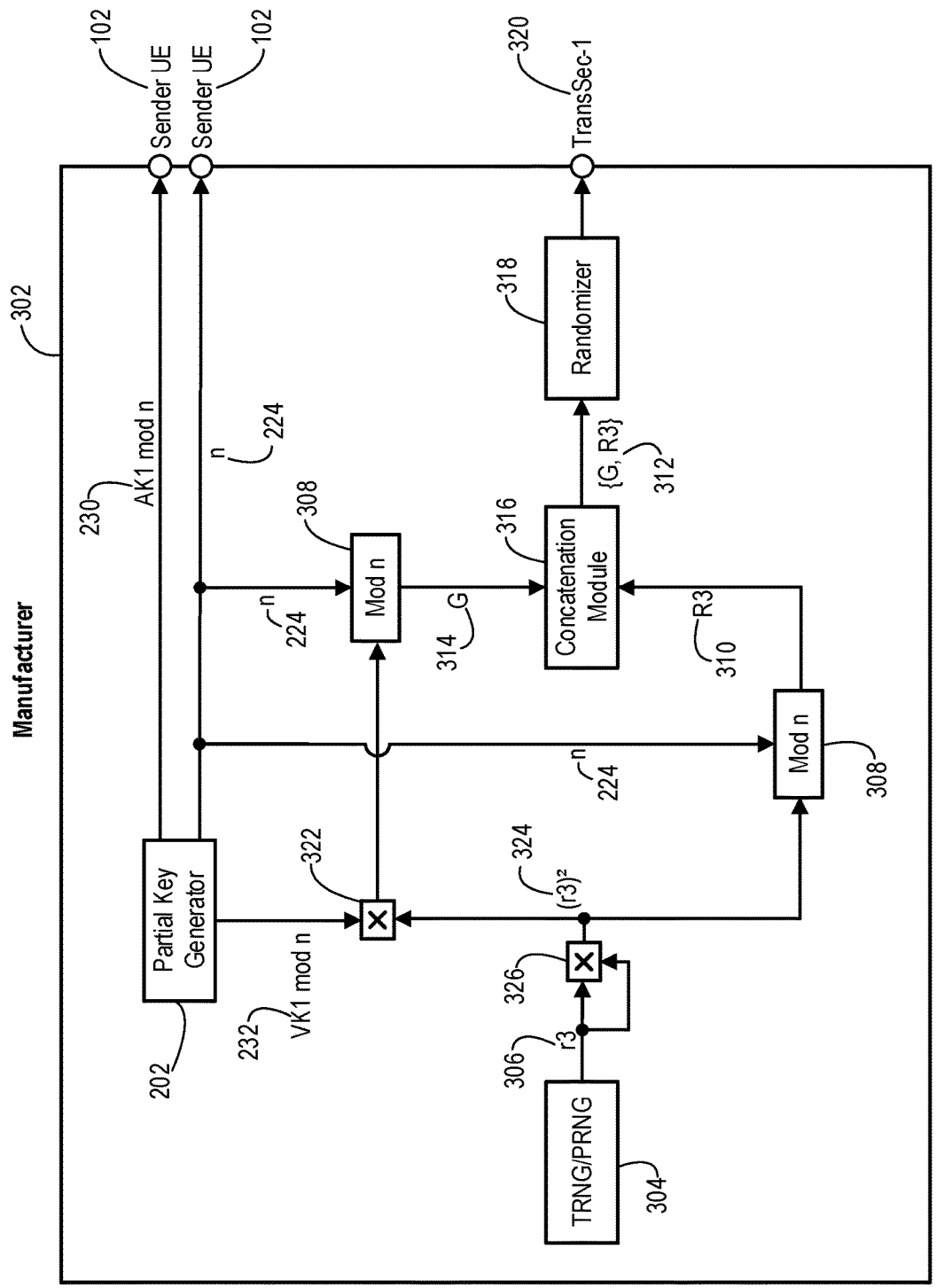
FIG. 3 is a schematic that illustrates an architecture of the manufacturer module, which may use a partial key generator module to generate two partial secrets and distribute them, in accordance with at least one example.

FIG. 3 is a schematic that illustrates a manufacturer module 302, which may include the partial key generator module 202, for the sender UE 102 in accordance with at least one example. In at least one example, the manufacturer module 302 outputs the first partial secret AK1 mod n 230 of the sender UE 102, and the composite number n 224 to the sender UE 102 and to the modulo n, mod n module 308. In at least one example, a random number generator module TRNG/PRNG 304 circuit generates a random number r3 306. The random number r3 306 is multiplied by itself using a multiplier 326 to compute its square $(r3)^2$ 324 and it is converted into the modulus n numbering system by mod n module 308 and the result is R3 310:

$$R3\ 310 = (r3)^2 \bmod n \qquad \text{Eq. 1}$$

In at least one example the output $(r3)^2$ 324 is multiplied with the second partial secret VK1 mod n 232 to encrypt the second partial secret of the sender UE 102, and the result is converted into the modulus n numbering system by mod n module 308. The encrypted second partial secret is G 314 mod n, given by:

$$G\ 314 = (r3)^2 * VK1 \bmod n \qquad \text{Eq. 2}$$

In at least one example, a concatenation module 316 concatenates information elements G 314 and R3 310 to produce a concatenated message {G, R3} 312 containing two the two information elements. The concatenated message {G, R3} 312 is scrambled by a randomizer module 318 that produces the encrypted transformed partial secret namely TransSec-1 320 of the sender UE. Consequently, the encrypted transformed partial secret is securely transmitted by the manufacturer module 302 of a sender UE 102 to the authentication service module 104. This process may be done only once at the time of manufacturing of the sender UE, or at the time of activating the sender UE 102 by the provider of the authentication service module 104.

In at least one example, the manufacturer module 302 may also generate the two partial secrets for the receiver UE 106, in a similar way as described in the example of the manufacturer module 302 of FIG. 3. In at least one example, the first partial secret AK2 mod n 126 of the receiver UE 106 may be sent by the manufacturer module 302, to the receiver UE 106 to. Moreover, the second partial secret of the receiver UE 106 may be first encrypted and then scrambled to generate an encrypted transformed partial secret that is transmitted to the authentication service module 104 of a receiver UE 102 to the authentication service module 104, in accordance with at least one example.

Figure 4:
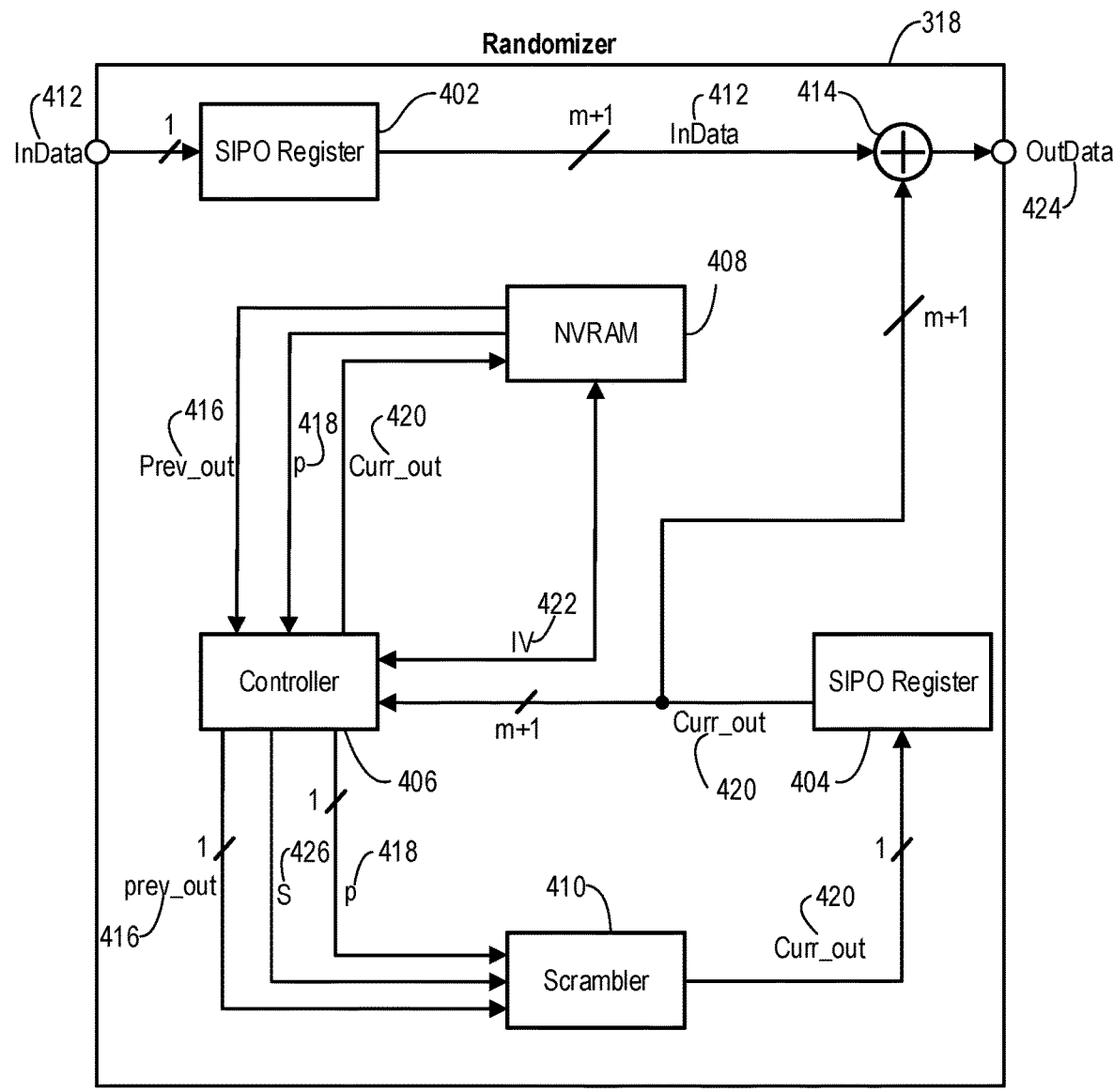
FIG. 4 is a schematic that illustrates a block diagram of a randomizer module to secure information leakage over the channel, in accordance with at least one example.

FIG. 4 is a schematic that illustrates an architecture of randomizer module 318, which comprises serial in parallel out (SIPO) shift registers: SIPO register 402 and SIPO register 404, a controller 406, a non-volatile random-access memory (NVRAM) 408, and a scrambler 410, in accordance with at least one example. The SIPO register 402 takes a serial data InData 412 from the partial key generator module 202 and converts it into a parallel output, which is fed to an XOR operator 414. The NVRAM 408 retains the data stored even when the power is switched off. A previous output Prev_out 416 and a prime integer p 418 taken from the NVRAM 408 are sent to the controller 406. The controller 406 sends an initialization vector IV 422 to the NVRAM 408. Another input Curr_out 420 to the controller 406 is from the SIPO register 404. The controller 406 retrieves the initialization vector IV 422, if the previous output Prev_out 416 is not available against the initialization vector IV 422, then the controller 406 outputs Prev_out 416 and S 426 to the scrambler 410; otherwise, the IV 422 is used as the Prev_out 416 to the scrambler 410. A parallel scrambler is implemented using a linear feedback shift register circuit. The output Curr_out 420 from the scrambler 410 is sent to the SIPO register 404. The SIPO register 404 has the single output Curr_out 420, which is fed into the controller 406 and XOR-ed with the output of the other SIPO register 402 by the XOR operator 414 which produces the final output namely OutData 424. In at least one example, a randomizer module 318 may be initialized once with an initialization vector IV 422 and continue to operate in a synchronized manner using the internal configurations in p 418 and Prev_out 416.

Figure 5:
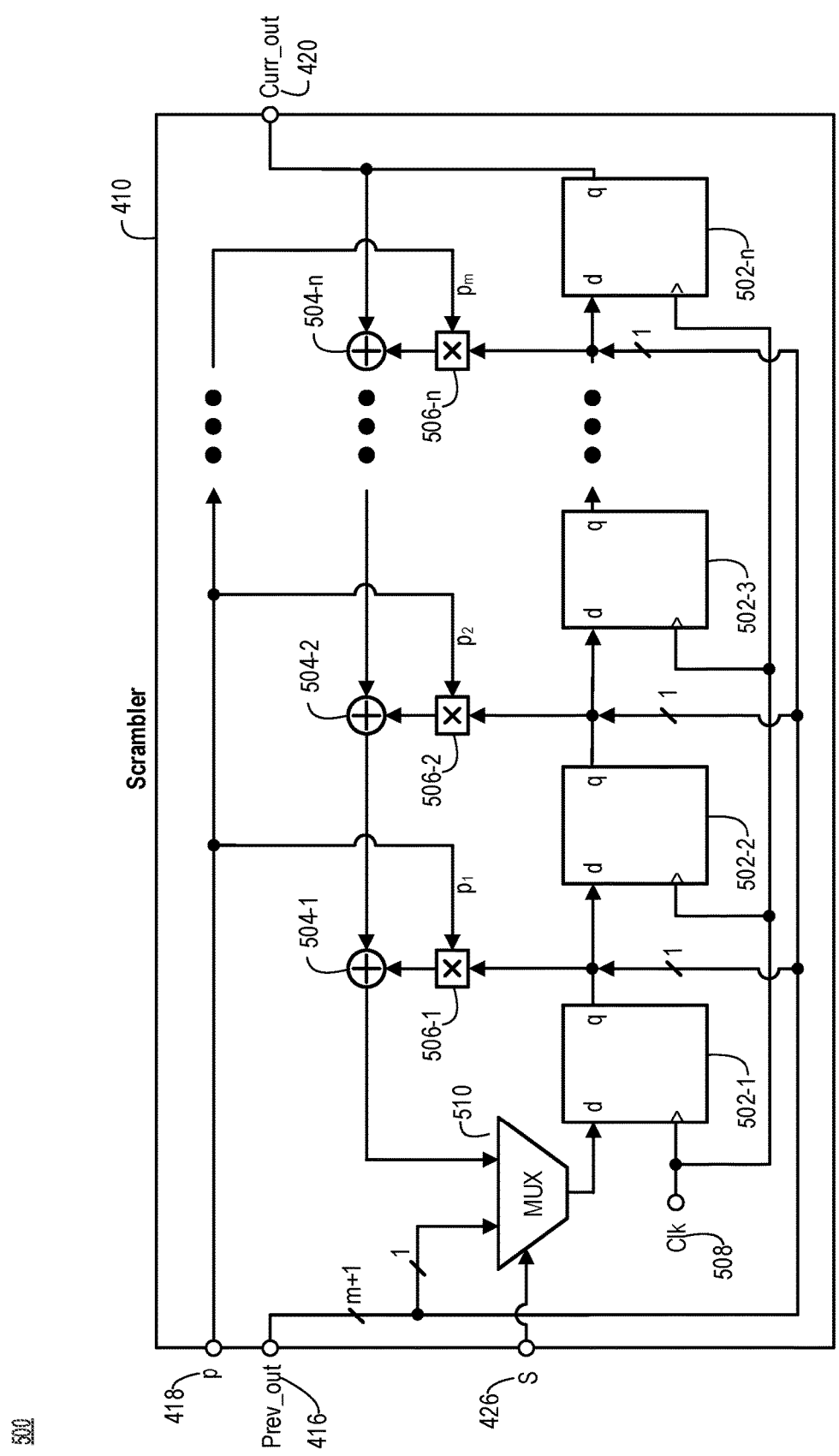
FIG. 5 is a schematic that illustrates a block diagram of a scrambler module depicting one possible example where a liner feedback shift register (LFSR) circuit may be used, in accordance with at least one example.

FIG. 5 is a schematic that illustrates the architecture of the scrambler 410. The scrambler 410 comprises a series of D flip-flops 502 connected in a cascade, forming a linear feedback shift register (LFSR) circuit that provides a controlled and bounded delay, in accordance with at least one example. The LFSR input is an output of a linear function of its previous states and it generates pseudo random numbers. The scrambler 410 takes the inputs Prev_out 416 and p 418 from the controller 406. It further comprises XOR operators 504 and multipliers 506 that select the outputs from the flip-flops configured by p 418. The D flip-flops 502 are storage elements that create the feedback loops and generate random data bits. The D flip-flops 502 store a single binary digit 0 or 1 and retain the data for a single clock cycle. From among the Prev_out 416 and output of XOR operator 504-1, one is selected by MUX 510 and given to the D flip-flop 502-1. The other input provided is a clock signal Clk 508. Since the D flip-flops 502 are edge-triggered devices, the output changes at either the falling or the rising edge of the Clk 508. The output of the multiplier 506-1 is XOR-ed with the output of the succeeding XOR operator 504-2. The output q from the D flip-flop 502-1 forms input of the succeeding D flip-flop 502-2, the other input is the clock signal Clk 508. The circuit is implemented sequentially in a cascaded manner depending on the number of D flip-flops 502 needed for the circuit. The output of the last D flip-flop 502-n is available as Curr_out 420 and is fed as the feedback through XOR gate 504-n.

Figure 6:
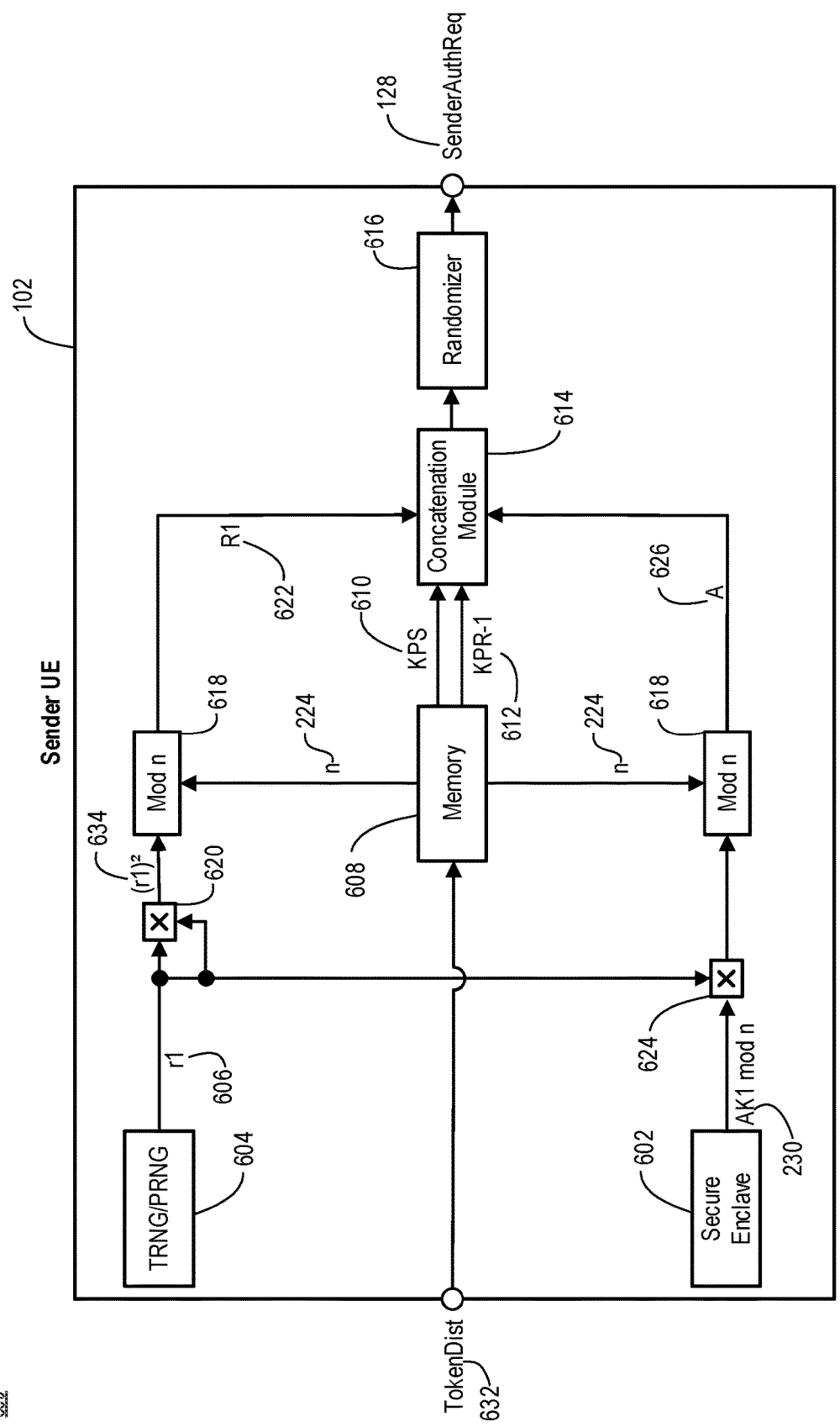
FIG. 6 is a schematic that illustrates an architecture of a sender UE, which may be used for generating a sender authorization request message containing a first partial secret that may be encrypted using a QR method and scrambled using a randomizer module, in accordance with at least one example.

FIG. 6 is a schematic that illustrates the architecture of an example sender UE 102, in accordance with at least one example. A sender UE 102 includes a secure enclave 602 that stores the first partial secret AK1 mod n 230, which is produced by the manufacturer module 302 at the time of manufacturing of the sender UE 102 or it is stored in a secure location once the sender UE is issued by a business entity owing the sender UE. A TRNG/PRNG module 604 is a true random number generator module or pseudo-random number generator module that generates a random number r1 606. The r1 606 is multiplied by itself using a multiplier 620 to generate the squared output $(r1)^2$ 634 which is converted modulus n numbering by mod n module 618 to give R1 622.

$$R1\ 622 = (r1)^2 \bmod n \qquad \text{Eq. 03}$$

The first partial secret AK1 mod n 230 is encrypted by multiplying it with r1 606 using a multiplier 624 and product is converted into the modulus n numbering by mod n module 618 to generate the encrypted first partial secret A 626.

$$A\ 626 = r1 * AK1 \bmod n \qquad \text{Eq. 04}$$

In at least one example, the sender UE also includes a memory module 608 that stores TokenDist 632, sent by the authentication service module 104 that contains the authentication status of the sender UE 102. The memory module 608 also stores information elements: the composite number n 224 for the modulus n numbering system, a known public identity KPS 610 of the sender UE 102, and a known public identity KPR-1 612 of the receiver UE 106. A concatenation module 614 merges multiple information elements KPS 610, KPR-1 612, R1 622 and A 626 as output of mod n module 618 to generate a sender authorization request message, which is subsequently scrambled by the randomizer module 616 to generate a scrambled sender authorization request SenderAuthReq message 128, which is sent to the receiver UE 106.

Figure 7:
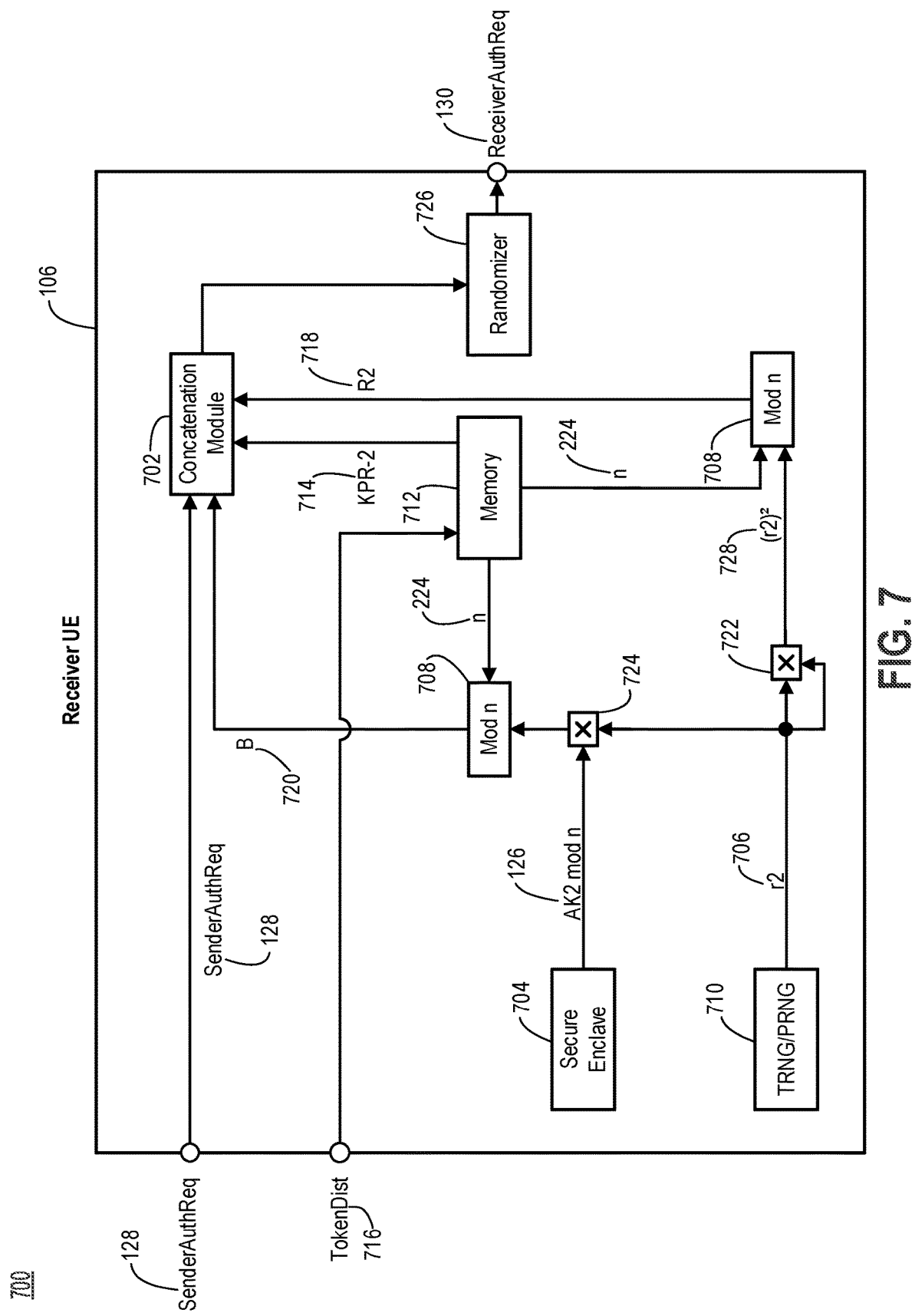
FIG. 7 is a schematic that illustrates an architecture of a receiver UE, which may want to authenticate a sender UE, in accordance with at least one example.

FIG. 7 is a schematic that illustrates the architecture of a receiver UE 106. A receiver UE 106 includes a secure enclave 704 that stores the first partial secret AK2 mod n 126 of the receiver UE 106, which is produced by the manufacturer module 302 at the time of manufacturing; or the first partial secret is stored in a secure location once the receiver UE 106 is issued by a business entity owing the receiver UE 106. A TRNG/PRNG module 710 is a true random number generator module or pseudo-random number generator module that generates a random number r2 706. The first partial secret of the receiver UE is encrypted by multiplying it with the random number r2 706 using a multiplier 724. The encrypted first partial secret of the receiver UE is converted into the modulus n numbering system by mod n module 708 and is represented by B 720:

$$B\ 720 = r2 * AK2 \bmod n \qquad \text{Eq. 05}$$

The r2 706 is multiplied by itself using a multiplier 722 to generate the square $(r2)^2$ 728 of the random number r2 and the square of the random number is converted into the modulus n numbering system by mod n module 708 and the number is represented as R2 718.

$$R2\ 718 = (r2)^2 \bmod n \qquad \text{Eq. 06}$$

The memory module 712 of the receiver UE stores TokenDist 716, sent by the authentication service module 104 that contains the authentication status of the sender UE 102. The concatenation module 702 of the receiver UE merges multiple information elements comprising the encrypted first partial secret B 720 of the receiver UE 106, a known public identity KPR-2 714 stored in the memory module 712 of the receiver UE 106, the square of the random number r2 706 in modulus n numbering system represented by R2 718, and the scrambled sender authorization request SenderAuthReq message 128 sent by the sender UE, to generate a receiver authorization request message. Randomizer module 726 scrambles the receiver authorization request message to produce a scrambled receiver authorization request ReceiverAuthReq message 130.

Figure 8A:
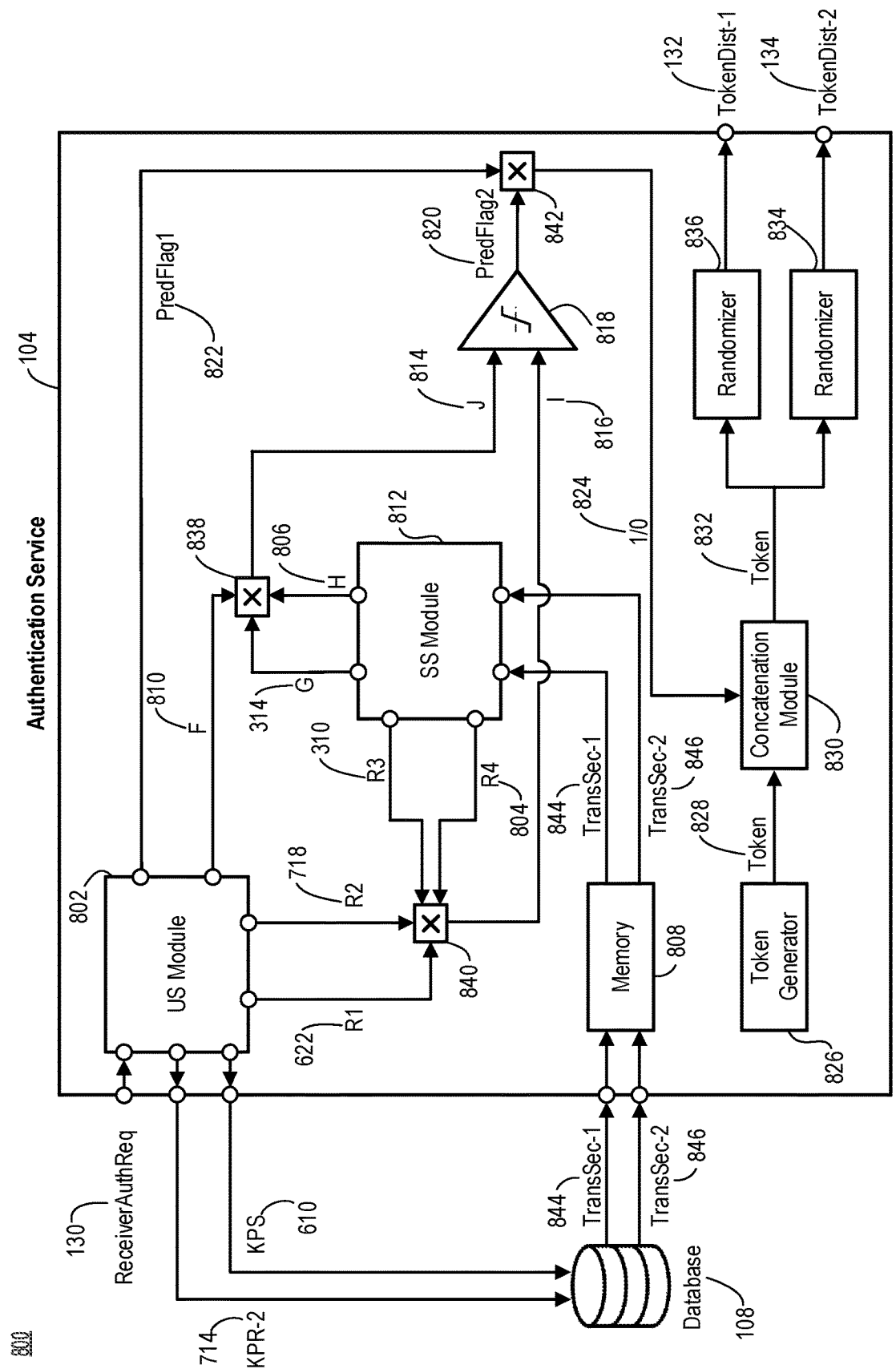
FIG. 8A is a schematic that illustrates an architecture of an authentication service, which may process the receiver authorization request message received from a receiver UE to authenticate a sender UE on behalf of the receiver UE, in accordance with at least one example.

FIG. 8A is a schematic that illustrates the architecture of the authentication service module 104, which processes the authentication request of the receiver UE 106 to authenticate the sender UE 102, in accordance with at least one example. The authentication of the sender UE 102 succeeds, if by applying the mathematical operations on the information elements included in SenderAuthReq message 128 and ReceiverAuthReq message 130 correspond to the information elements included in transformed partial secrets, stored in the database storage system 108, of the sender UE 102 and the receiver UE 106. The ReceiverAuthReq message 130 of the receiver UE 106 is processed by a user side (US) module 802, which unscrambles the ReceiverAuthReq message 130 and separates information elements comprising R1 622, R2 718, KPS 610 of the sender UE 102, KPR-2 714, and encrypted first partial secret B 720 of the receiver UE 106. The US module 802 also computes a product F 810 that is a square of the product of A 626 and B 720; (A*B) 858, from Eq. 03 and Eq. 06 respectively and outputs a status PredFlag1 822. In at least one example, the US module 802 sends the KPS 610 and KPR-2 714 to the database storage system 108 to retrieve TransSec-1 844 and TransSec-2 846 and store them in the memory module 808, later to be used by server side (SS) module 812. The encrypted second partial secrets, G 314 of the sender UE 102 and H 806 of the receiver UE 106, and R3 310 and R4 804 are generated by the server side (SS) module after it retrieved the encrypted transformed partial secrets: TransSec-1 844 and TransSec-2 846 from the memory module 808. The product F 810 from the US module 802 is then multiplied with the second partial secrets G 314 and H 806 from the SS module 812. The output J 814 is:

$$J\ 814 = \left((A*B)^2 * G*H\right) \bmod n \qquad \text{Eq. 07}$$

$$J\ 814 = \left(A^2 * G * B^2 * H\right) \bmod n \qquad \text{Eq. 08}$$

In at least one example, R4 804 and H 806 of the receiver UE 106, computed by manufacturer module 302, are computed in a similar manner as R3 310 and G 314 of the sender UE 102 by using equations Eq. 01 and 02 respectively.

$$R4\ 804 = (r4)^2 \bmod n \qquad \text{Eq. 09}$$

$$H\ 806 = (r4)^2 * VK2 \bmod n \qquad \text{Eq. 10}$$

Now the authentication service module 104 has information elements comprising G 314, A 626, B 720 and H 806. First step is to compute A2*G as shown in Eq. 11. The VK1 mod n 232 is the multiplicative inverse of the square of AK1 mod n and hence Eq. 11 simplifies to Eq. 12.

$$A^2 * G = ((r1 \bmod n) * AK1 \bmod n)^2 * \left(((r3)^2 \bmod n) * VK1 \bmod n\right) \quad \text{Eq. 11}$$

$$A^2 * G = \left((r1)^2 \bmod n\right) * \left((r3)^2 \bmod n\right) = R1 * R3 \quad \text{Eq. 12}$$

The authentication service module 104 further computes B2*H using Eq. 13. The term VK2 mod n is the multiplicative inverse of the square of AK2 mod n, and hence Eq. 13 simplifies to Eq. 14.

$$B^2 * H = ((r2 \bmod n) * AK2 \bmod n)^2 * \left(((r4)^2 \bmod n) * VK2 \bmod n\right) \quad \text{Eq. 13}$$

$$B^2 * H = \left((r2)^2 \bmod n\right) * \left((r4)^2 \bmod n\right) = R2 * R4 \quad \text{Eq. 14}$$

In at least one example, the values of A2*G from Eq. 12 and B2*H from Eq. 14 are substituted in Eq. 08. If the first partial secrets stored on the devices and the second partial secrets stored in the database storage system 108 of the authentication service module 104 are correct, then J 814 input to a comparator module 818 becomes:

$$J\ 814 = R1 * R2 * R3 * R4 \quad \text{Eq. 15}$$

The second input to the comparator module 818 is I 816, which is the product of R1 622, R2 718, R3 310, and R4 804 as computed by multiplier 840:

$$I\ 816 = R1 * R2 * R3 * R4 \quad \text{Eq. 16}$$

The comparator module 818 checks whether the two inputs J 814 and I 816 are equal and the value of PredFlag2 820 is set based on the status of the comparison.

In at least one example, to inform the sender and receiver UEs about the authentication status, a token generator module 826 generates a token 828. The token 828 is concatenated with the product 824, from multiplier 842, of two flags, PredFlag1 822 and PredFlag2 820, by the concatenation module 830 and the output is a new token 832. In at least one example, token 832 is then given as an input to randomizer module 836 and randomizer module 834 to produce two distinct scrambled tokens: TokenDist-1 132 for the sender UE 102 and TokenDist-2 134 for the receiver UE 106, respectively. The tokens TokenDist-1 132 and TokenDist-2 134 communicate the status of authentication of the sender UE 102 to both the sender UE 102 and the receiver UE 106 along with the string of authentication token 828 at which the sender UE 102 is authenticated. Once the sender UE 102 and receiver UE 106 receive successful status authentication tokens, they can start exchanging secret messages by establishing a secure and encrypted channel.

Figure 8B:
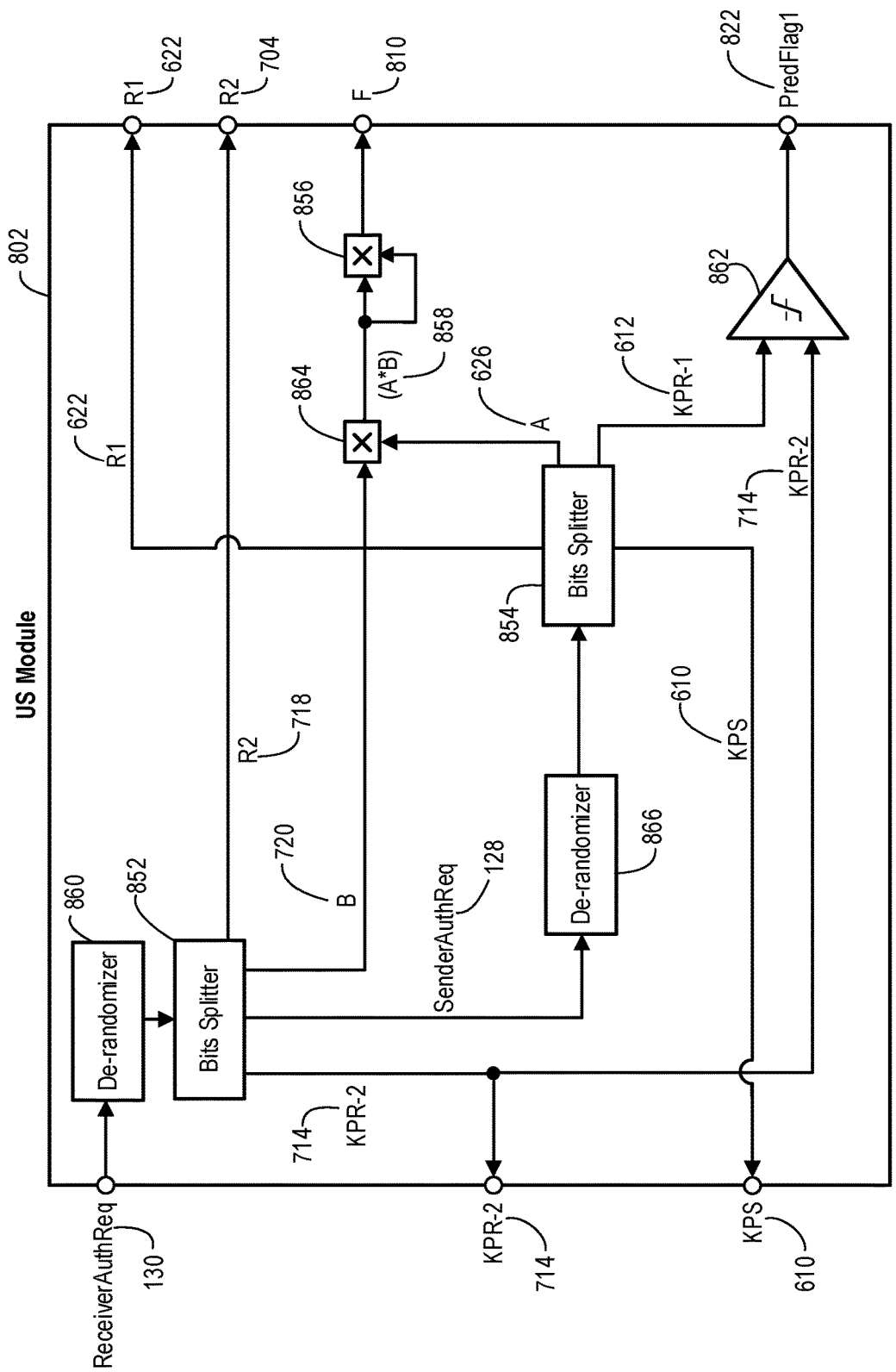
FIG. 8B is a schematic that illustrates an architecture of a user side module of the authentication service module of FIG. 8A, in accordance with at least one example.

FIG. 8B is a schematic that illustrates an architecture of a user side (US) module 802 of FIG. 8A, which processes the authentication request of the receiver UE 106 to authenticate the sender UE 102, in accordance with at least one example. The scrambled ReceiverAuthReq message 130 from the receiver UE 106 is unscrambled by a de-randomizer module 860. The unscrambled receiver authorization message is fed into a bits splitter module 852, which separates the unscrambled ReceiverAuthReq message 130 to information elements: SenderAuthReq message 128, KPR-2 714, R2 718 and B 720 respectively. The de-randomizer module 866 unscrambles the SenderAuthReq message 128 and the information elements are separated by a bits splitter module 854 comprising: (1) the encrypted first partial secret A 626 of the sender UE 102, (2) the known public identity of the sender UE KPS 610, (3) the known public identity KPR-1 612 of the receiver UE stored in the memory module of the sender UE 102, and (4) R1 622. The encrypted first partial secret of the sender UE: A 626, and the encrypted first partial secret of the receiver UE: B 720 are multiplied by a multiplier 864 to generate a product (A*B) 858 that is multiplied by itself using multiplier 856 to produce F 810. A comparator module 862 determines whether KPR-1 612 and KPR-2 714 are equal. The status of the comparison is stored in an output flag PredFlag1 822. Finally, the outputs of US module 802: KPS 610, R1 622, R2 704, KPR-2 714, F 810 and PredFlag1 822 are provided to the authentication service module 104.

Figure 8C:
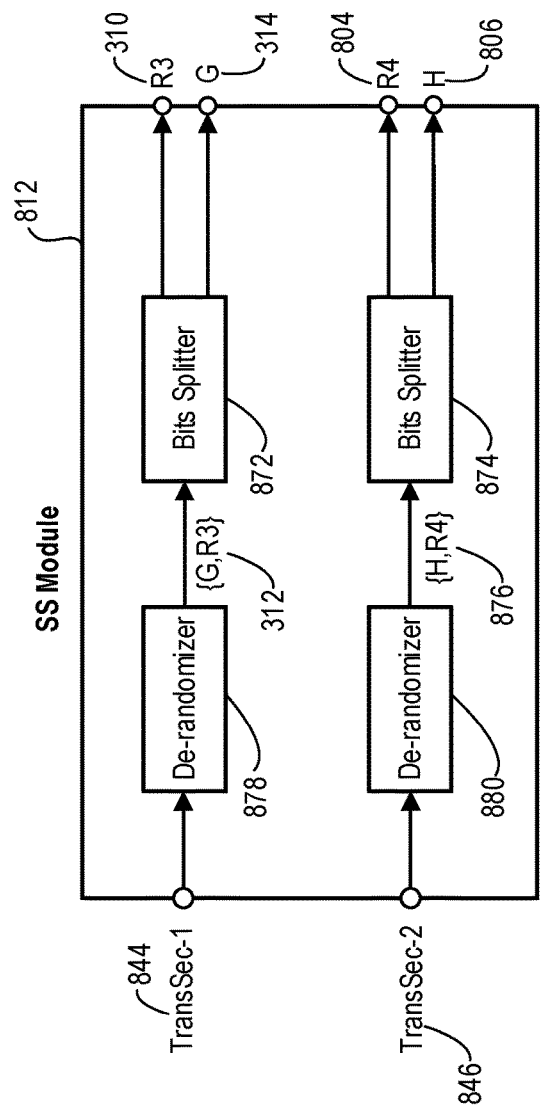
FIG. 8C is a schematic that illustrates an architecture of a server side module of the authentication service module of FIG. 8A, in accordance with at least one example.

FIG. 8C is a schematic that illustrates an architecture of the server side (SS) module 812 of FIG. 8A, which processes the encrypted transformed partial secrets of the sender UE 102 and the receiver UE 106 that are stored in a database storage system 108 connected to the authentication server, running the authentication service module 104 in a cloud in accordance with at least one example. The de-randomizer module 878 unscrambles the encrypted transformed partial secret TransSec-1 844 of the sender UE 102 and the associated information elements {G, R3} 312 are separated by a bits splitter module 872 into R3 310 and G 314 respectively. The second de-randomizer module 880 unscrambles the encrypted transformed partial secret TransSec-2 846 of the receiver UE 106, and the associated information elements {H, R4} 876 are split by a bits splitter module 874 into R4 804 and H 806. The outputs of SS module 812 comprise R3 310, G 314, R4 804 and H 806, which are inputs of the authentication service module 104 to authenticate the sender UE 102 as requested by the receiver UE 106.

Figure 9:
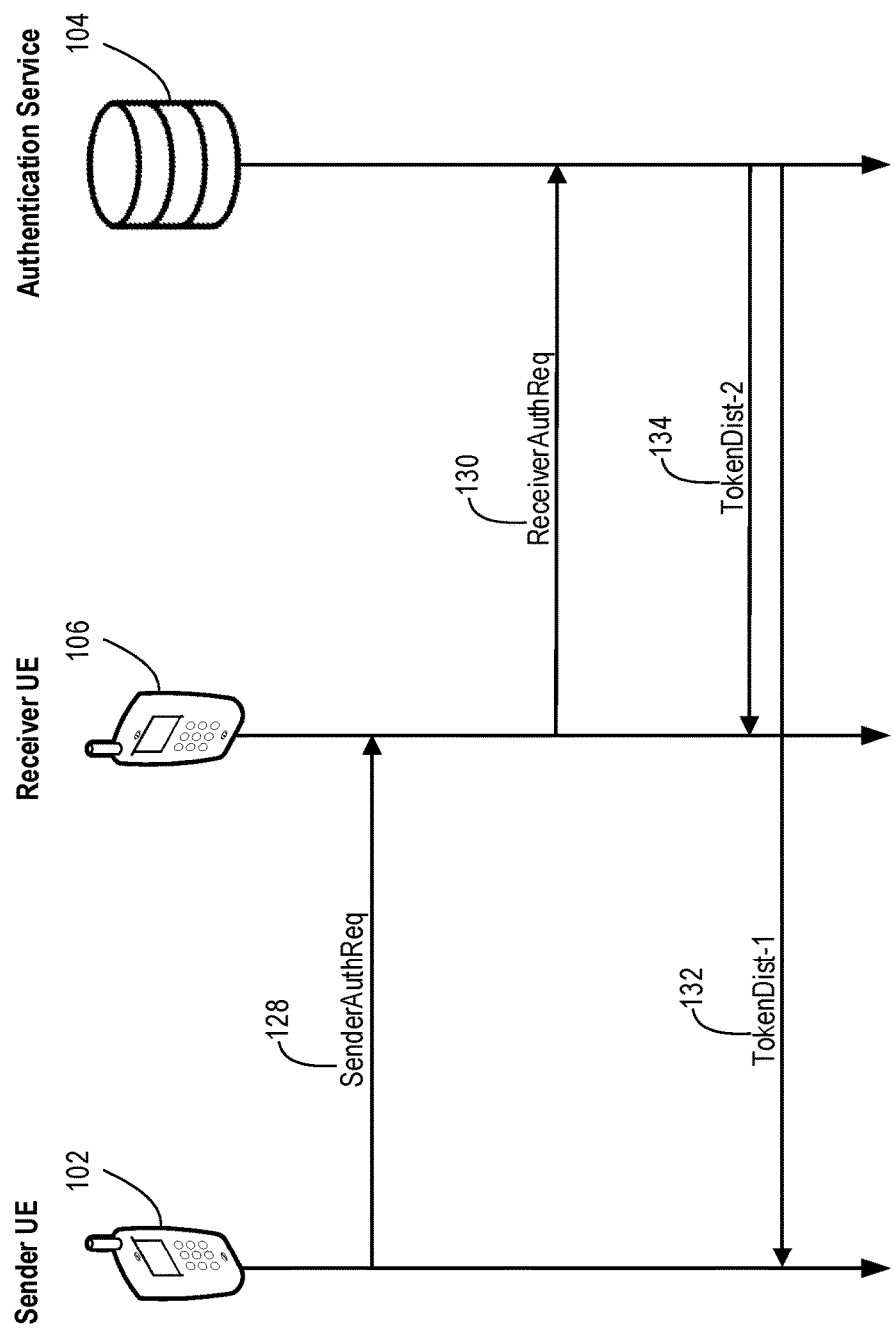
FIG. 9 is a schematic that illustrates a protocol ladder diagram of a lightweight authentication protocol, in accordance with at least one example.

FIG. 9 shows a flow of messages in an authentication protocol ladder diagram used by the authentication service module 104 to authenticate UEs, in accordance with at least one example. The protocol consists of two or more user equipment and an authentication service. In one example, the sender UE 102, the receiver UE 106, and the authentication service module 104 are illustrated. The sender UE 102 generates SenderAuthReq message 128 and sends it to the receiver UE 106. The receiver UE 106 processes the SenderAuthReq message 128, generates a ReceiverAuthReq message 130 and sends it to the authentication service module 104. The authentication service module 104 verifies the correctness of the second partial secrets stored in the database storage system by comparing it with the corresponding first partial secrets stored on the devices, then authentication messages TokenDist-1 132 and TokenDist-2 134 are sent from the authentication service module 104 to the sender UE 102 and the receiver UE 106 respectively. In at least one example, TokenDist-1 132 and TokenDist-2 134 contain a success or failure status of the authentication of the sender UE 102 for both communicating UEs.

Figure 10:
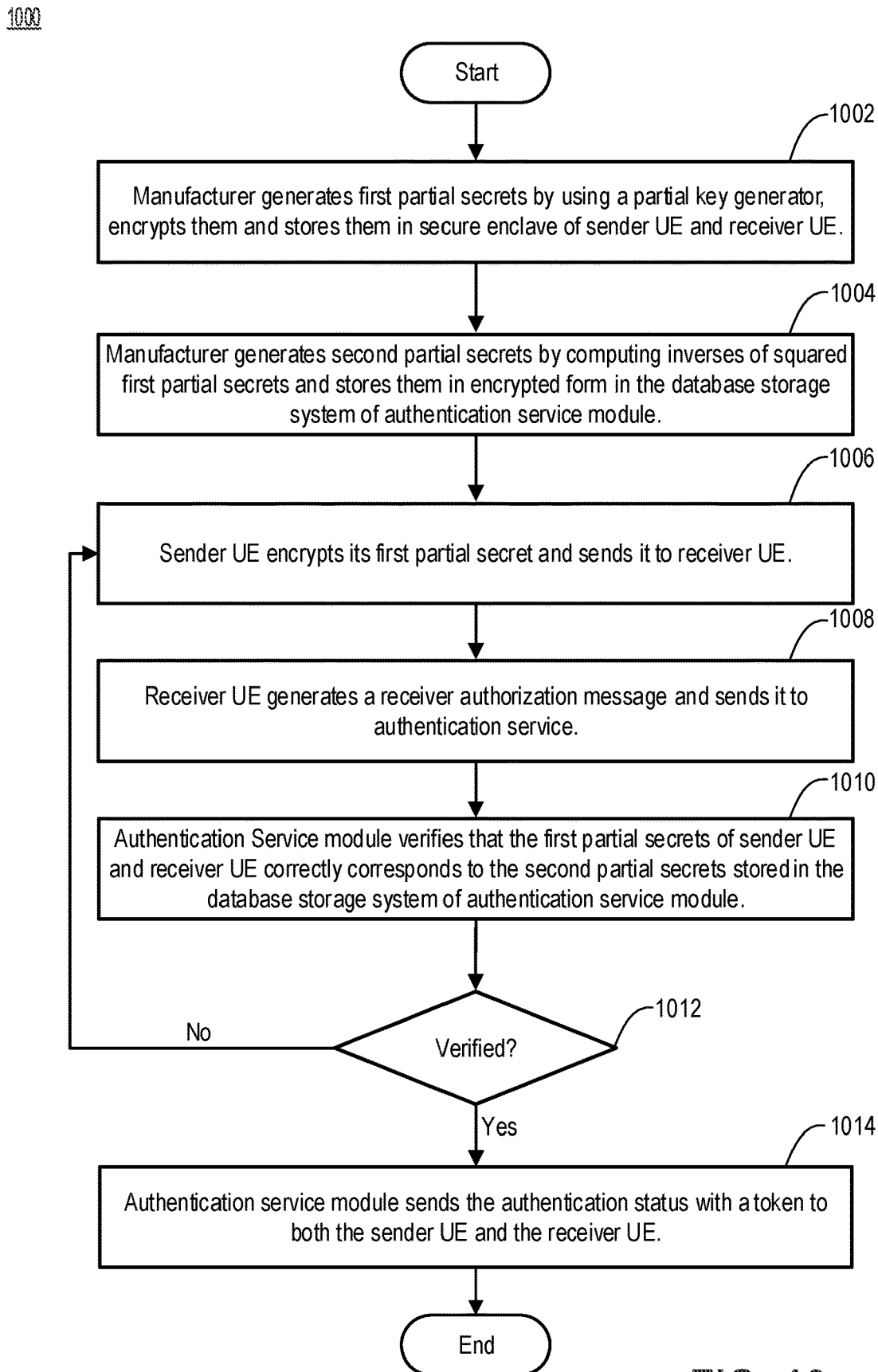
FIG. 10 is a flowchart that illustrates a lightweight and secure authentication protocol, wherein the authentication service module may perform the authentication process, in accordance with at least one example.

FIG. 10 shows a flowchart that illustrates different operations performed by different devices. The authentication service module 104 runs an authentication process to verify whether the first partial secrets sent in the messages by the sender UE 102 and the receiver UE 106 correspond to the second partial secrets of the sender UE 102 and the receiver UE 106. In at least one example, at box 1002, manufacturer module 302 generates the first partial secrets for the sender UE 102 and the receiver UE 106 using partial key generator module 202. The partial key generator module 202 executes a secure key derivation function, encrypts the first partial secrets and stores them in the secure enclaves of the sender and receiver UEs. At box 1004, the multiplicative inverses of squared first partial secrets are computed to generate second partial secrets by manufacturer module 302 and sends them to the authentication service module 104. At box 1006, the sender UE 102 encrypts its first partial secret and scrambles it before sending to the receiver UE 106. At box 1008, the receiver UE 106 generates a receiver authorization message that contains information elements of the sender UE 102 and the receiver UE 106, scrambles the message and sends it to the authentication service module 104. At box 1010, the authentication service module 104 verifies that the received first partial secrets of the sender UE 102 and the receiver UE 106 and other information elements correctly correspond to the information elements of the sender UE 102 and the receiver UE 106 that are stored in the database storage system of the authentication service module 104. At decision box 1012, if the verification step succeeds, then at box 1014, the authentication service module 104 sends the authentication status with a token to both the sender UE 102 and the receiver UE 106. If the verification step fails at box 1012, then the protocol restarts at box 1006 to make the second attempt of a predefined number of attempts.

Figure 11:
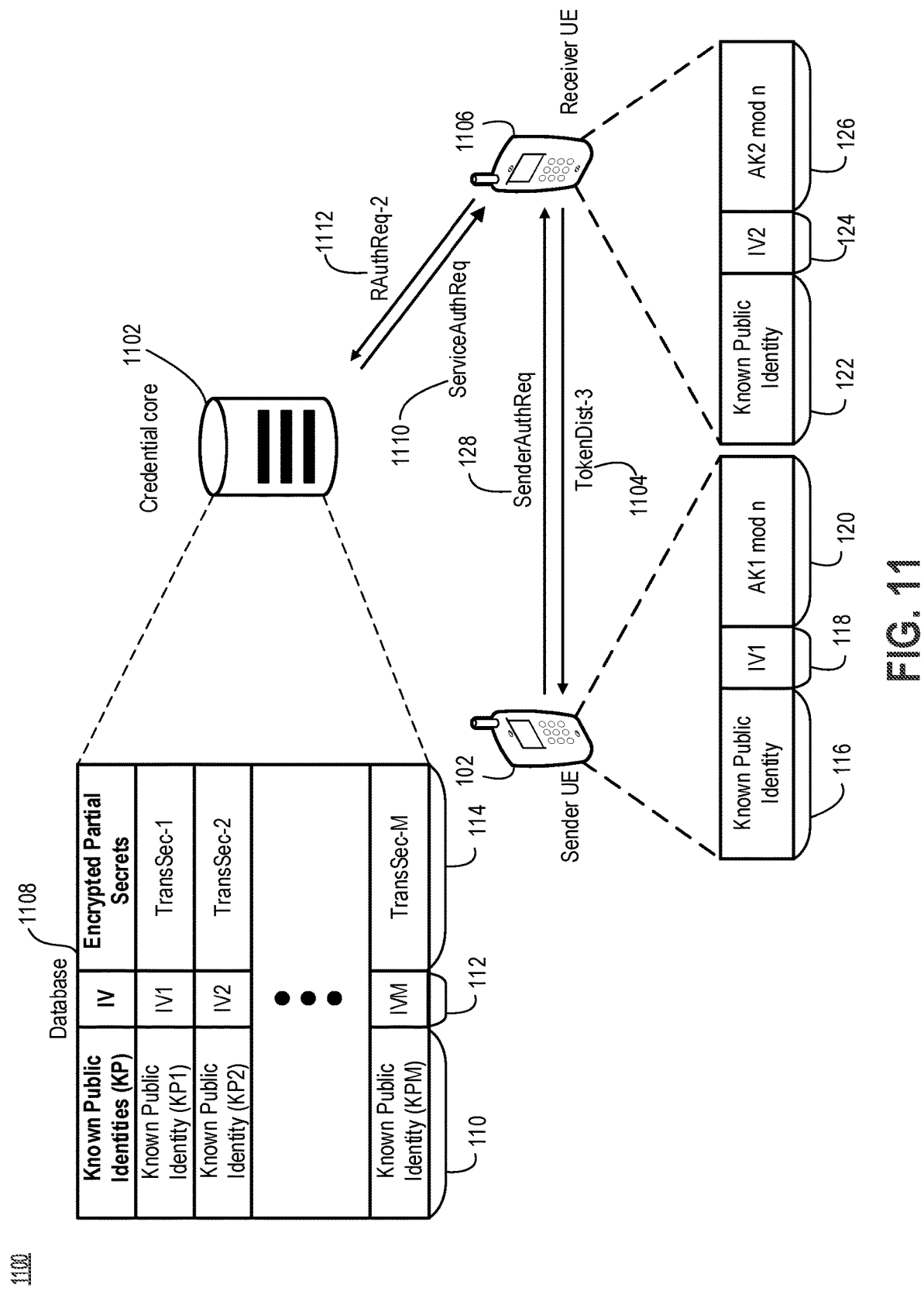
FIG. 11 a schematic that illustrates a system level diagram of an authentication system and protocol between a sender UE and a receiver UE using an authentication service, wherein the authentication service module runs on receiver UE and takes assistance from a credential core for retrieving relevant information elements, in accordance with at least one example.

FIG. 11 is a schematic that illustrates a system level diagram of an authentication system. In this example, the receiver UE 1106 runs the authentication process of the authentication service module on its hardware. The receiver UE 1106 only needs transformed partial secret information element of the sender UE 102 from a credential core module 1102 running in the cloud. Once the transformed partial secret of the sender UE 102 is received, then the receiver UE 1106 authenticates the sender UE 102 by running the authentication process. The messages are exchanged between the sender UE 102, the credential core 1102 and a receiver UE 1106. The credential core 1102 may include a storage database system 1108 to store known public identities KP of UEs in a first table 110, associated initialization vectors IV of randomizers in a second table 112 and associated encrypted transformed partial secrets of UEs in a third table 114. The transformed partial secret of a UE is a concatenated output that includes encrypted second partial secret of a UE, its associated initialization vector of randomizers, and known public identity of the UE. The sender UE 102 has a known public identity 116, an initialization vector IV1 118 for its randomizers, and a first partial secret AK1 mod n 120. The receiver UE 1106 has a known public identity 122, an initialization vector IV2 124 for its randomizers, and a first partial secret AK2 mod n 126. The sender UE 102 sends a scrambled sender authorization request SenderAuthReq message 128 to the receiver UE 1106. After processing the SenderAuthReq message 128, the receiver UE 1106 generates a receiver authentication service request RAuthReq-2 message 1112 and sends it to the credential core 1102. The credential core 1102 processes RAuthReq-2 message 1112, authenticates the receiver UE 1106, and then sends the transformed partial secret of the sender UE 102 to the receiver UE 1106 in a request ServiceAuthReq message 1110. The receiver UE 1106 processes ServiceAuthReq message 1110, extracts information elements and applies mathematical operations on the information elements of the sender UE 102 and the receiver UE 1106 to determine whether the second partial secret of the sender UE 102 received from the credential core 1102 is the correct mathematical transformation of the first partial secret received from the sender UE 102. The receiver UE 1106 sends an authentication token TokenDist-3 1104 to the sender UE 102 showing the status of the authentication process. If the status is success, then sender UE 102 is authenticated and they can subsequently establish a secure communication channel to exchange information. All information elements sent on the communication channel are time stamped to avoid replay attacks.

Figure 12A:
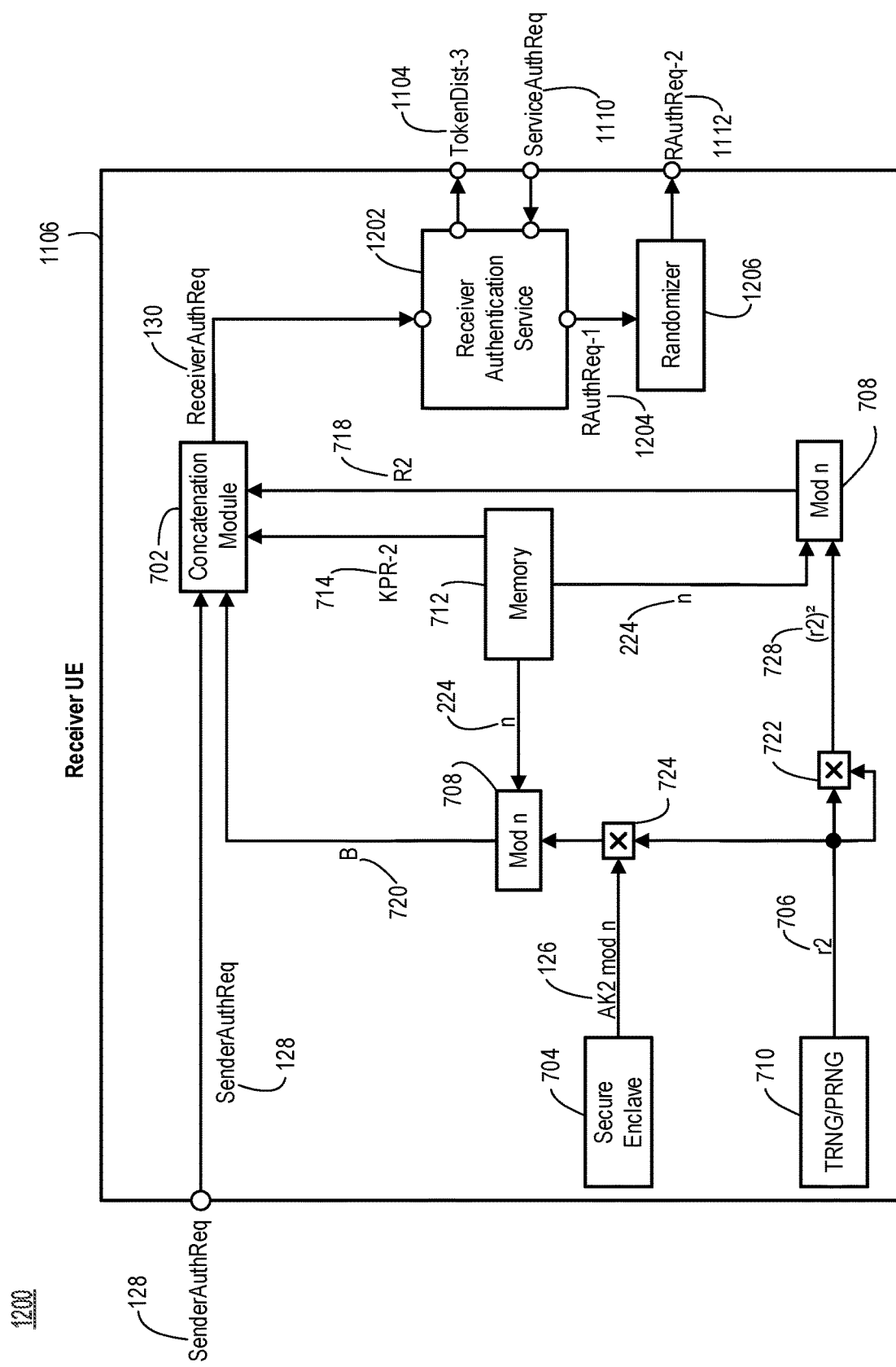
FIG. 12A is a schematic that illustrates an architecture of a receiver UE that can authenticate a sender UE by running an authentication service module at the receiver UE, in accordance with at least one example.

FIG. 12A is a schematic that illustrates the enhanced architecture of receiver UE 1106. The receiver UE 1106 includes receiver authentication service module 1202 that runs the authentication process of the authentication service module 104 within the receiver UE 1106. The functional behavior of the receiver UE 1106 is the same as that of the receiver UE 106 illustrated in FIG. 7 except the receiver authorization request ReceiverAuthReq message 130 is given as an input to the receiver authentication service module 1202. The receiver authentication service module 1202 generates an unscrambled RAuthReq-1 message 1204 that is scrambled by randomizer module 1206 to generate scrambled RAuthReq-2 message 1112, which is sent to the credential core 1102. The credential core 1102 processes RAuthReq-2 message 1112 and sends the transformed partial secret of the sender UE 102 in ServiceAuthReq message 1110. The receiver authentication service module processes ServiceAuthReq message 1110, extracts information elements and then applies different mathematical operations on the information elements of the sender UE 102 and the receiver UE 1106 to authenticate the sender UE 102. The status of the authentication process is delivered by a token namely TokenDist-3 1104, which is sent to the sender UE 102.

Figure 12B:
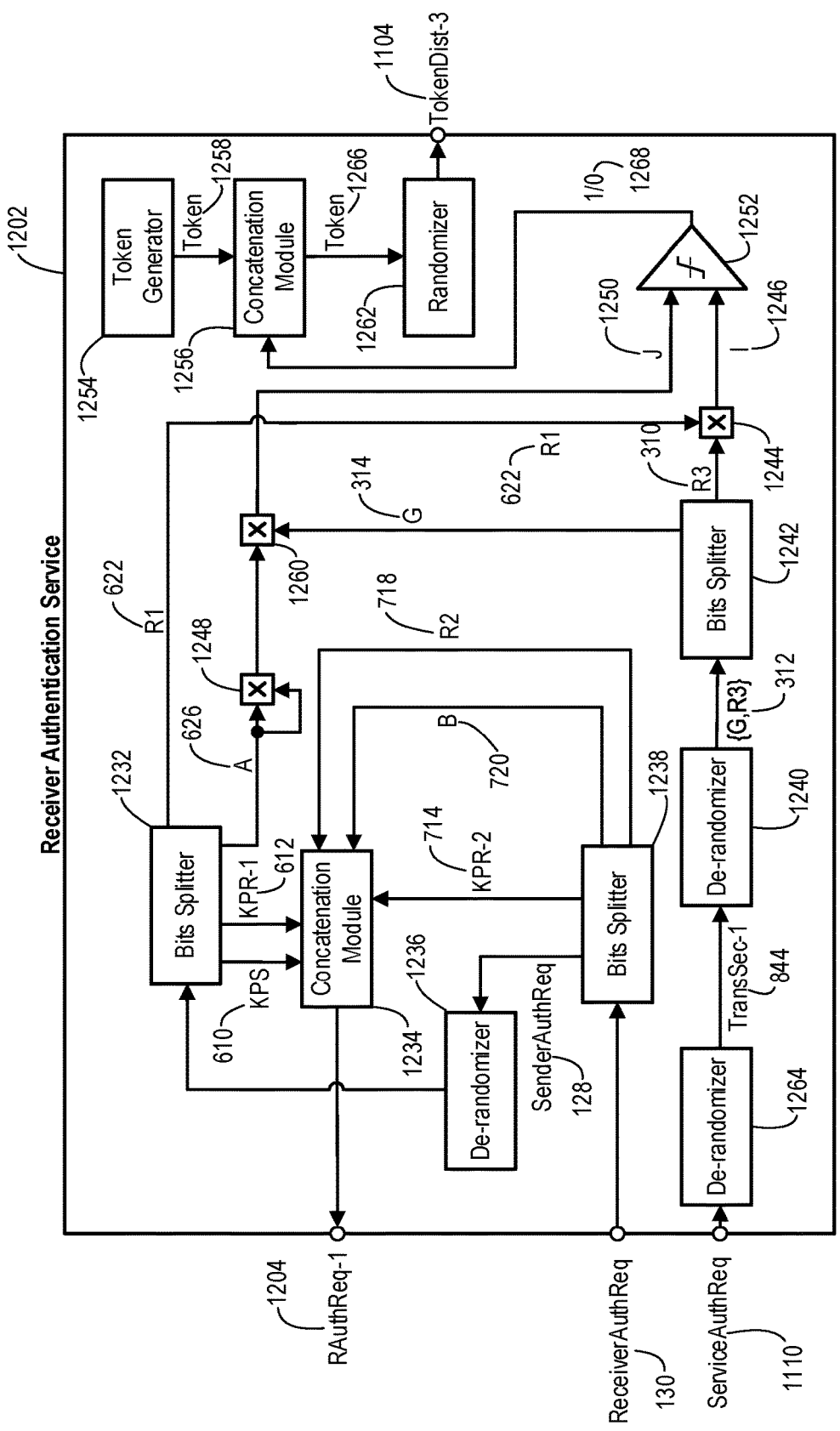
FIG. 12B is a schematic that illustrates an architecture of a receiver authentication service module of receiver UE of FIG. 12A that can authentication a sender UE, in accordance with at least one example.

FIG. 12B is a schematic that illustrates an architecture of the receiver authentication service module 1202 of FIG. 12A, which enables the receiver UE 1106 to authenticate the sender UE 102 by running the authentication process at the receiver UE 1106. In at least one example, the receiver authentication service module 1202 receives unscrambled ReceiverAuthReq message 130 from the receiver UE 1106. A bits splitter module 1238 separates the information elements included in the ReceiverAuthReq message 130 comprising: SenderAuthReq message 128, KPR-2 714, R2 718 and B 720. The SenderAuthReq message 128 is unscrambled by the de-randomizer module 1236 and a bits splitter module 1232 separates the information elements included in the SenderAuthReq message 128 comprising: KPS 610, KPR-1 612, R1 622 and A 626. A concatenation module 1234 merges the information elements comprising KPS 610, KPR-1 612, KPR-2 714, R2 718 and B 720 to generate the unscrambled receiver authentication service request RAuthReq-1 message 1204 that is scrambled by the randomizer module 1206 to generate the scrambled RAuthReq-2 message 1112, which is sent to the credential core 1102 by the receiver UE 1106. The ServiceAuthReq message 1110 sent by the credential core 1102 is received by the receiver UE 1106 on the communication channel and forwarded to the receiver authentication service module 1202. The de-randomizer 1264 unscrambles the ServiceAuthReq message 1110 to pass the encrypted transformed partial secret TransSec-1 844 to the de-randomizer module 1240. The de-randomizer module 1240 unscrambles TransSec-1 844 and the bits splitter module 1242 separates the information elements of unscrambled TransSec-1 844 that include G 314 and R3 310.

In at least one example, the encrypted first partial secret A 626 of the sender UE 102 is multiplied by itself using a multiplier 1248 to compute the square of A 626. Subsequently, the square of A 626 is multiplied with the encrypted second partial secret of the sender UE 102 using multiplier 1260 to compute a product J 1250. Similarly, the R1 622 is multiplied with R3 310 using multiplier 1244 to compute a product I 1246. A comparator module 1252 determines whether the product J 1250 is equal to the product I 1246. If both products are equal, it means the second partial secrets stored in the database 1108 of the credential core 1102 are correct mathematical transformations of the first partial secrets of the UEs stored on the devices. Therefore, the sender UE 102 is authenticated by the receiver authentication service module 1202. A token generator module 1254 generates a token 1258, and a concatenation module 1256 concatenates the token 1258 with the output flag 1268 of the comparator module 1252 to generate a new token 1266. The token 1266 scrambled by the randomizer module 1262 to generate a scrambled token, TokenDist-3 1104, which is sent by the receiver UE 1106 to the sender UE 102, as illustrated in FIG. 12A.

Figure 13A:
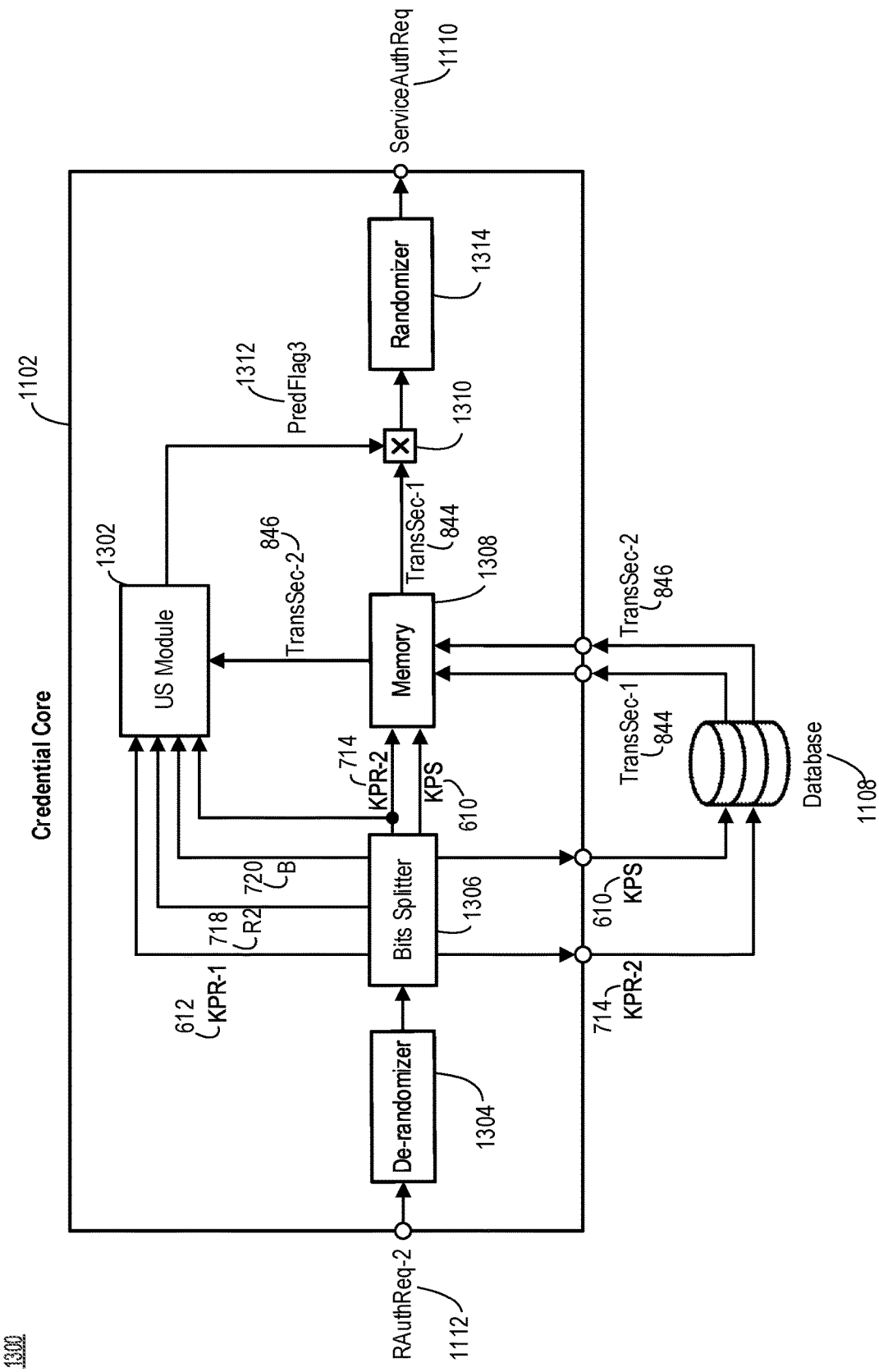
FIG. 13A is a schematic that illustrates an architecture of a credential core, in accordance with at least one example.

FIG. 13A is a schematic that illustrates a system architecture of a credential core 1102, wherein a receiver UE 1106 is responsible for authenticating whether the partial secret computed from the messages of a sender UE 102 corresponds to the mathematical transformations of the partial secrets stored in the database storage system 1108 of a credential core 1102, in accordance with at least one example. The receiver UE 1106 sends the receiver authentication service request RAuthReq-2 message 1112 to the credential core 1102. The credential core 1102 processes RAuthReq-2 message 1112. A de-randomizer module 1304 unscrambles the RAuthReq-2 message 1112. The information elements of RAuthReq-2 message 1112 are separated by a bits splitter module 1306, the information elements comprise KPS 610, KPR-1 612, KPR-2 714, R2 718, and B 720. The known public identity of the sender KPS 610 and the known public identity of the receiver KPR-2 714 are used to index into the database storage system 1108 to retrieve encrypted transformed partial secrets, TransSec-1 844 of the sender UE 102 and TransSec-2 846 of the receiver UE 1106, and to store the encrypted transformed partial secrets into the memory module 1308 of the credential core 1102. TransSec-1 844 and TransSec-2 846 contain the encrypted second partial secrets of the sender UE 102 and the receiver UE 1106 respectively. The credential core 1102 includes a user side (US) module 1302, which takes KPR-1 612, KPR-2 714, R2 718, B 720 and TransSec-2 846 as inputs to authenticate the receiver UE 1106 and authentication status is stored in a flag PredFlag3 1312. The credential core 1102 multiplies the TransSec-1 844 and PredFlag3 1312 using multiplier 1310. If the receiver UE 1106 is authenticated, the transformed partial secret of the sender UE 102 is selected and scrambled by a randomizer module 1314. The scrambled message namely service authorization request ServiceAuthReq message 1110 is sent to the receiver UE 1106.

Figure 13B:
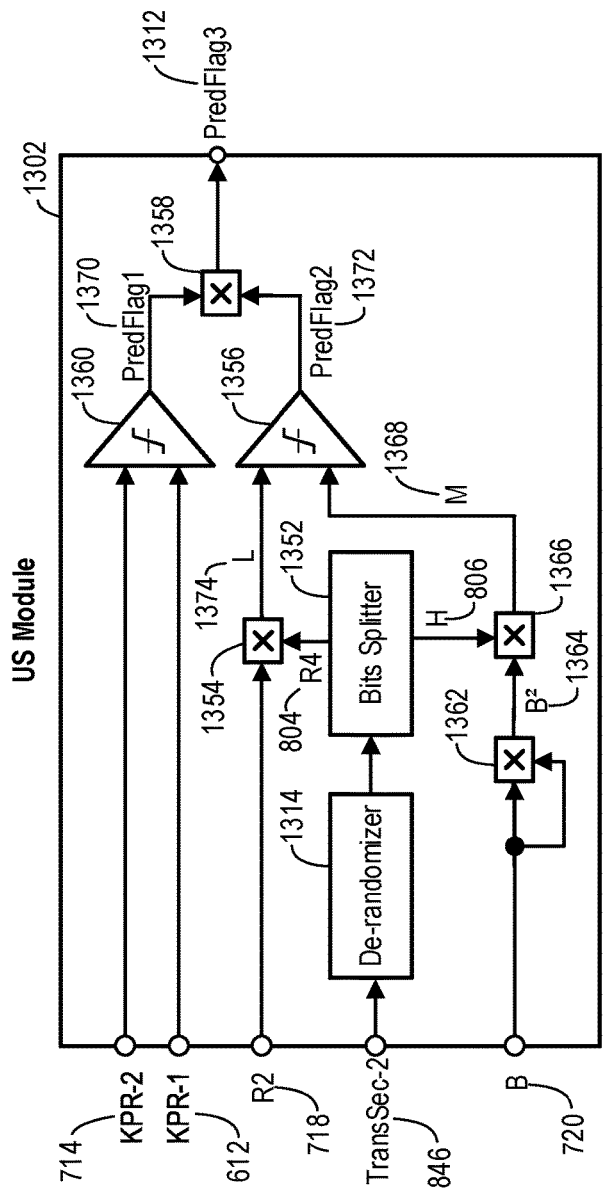
FIG. 13B is a schematic that illustrates an architecture of a user side module of the credential core of FIG. 8A, in accordance with at least one example.

FIG. 13B is a schematic that illustrates the architecture of a user side module 1302 of the credential core 1102. The user side module 1302 takes KPR-1 612, KPR-2 714, R2 718, B 720, and TransSec-2 846 as inputs to authenticate the receiver UE 1106. The encrypted transformed partial secret of the sender UE 102 is TransSec-2 846 which is unscrambled by a de-randomizer module 1314. The information elements in the unscrambled encrypted transformed partial secret of the sender UE 102 are separated by a bits splitter module 1352 to produce R4 804 and H 806. The encrypted first partial secret B 720 of the receiver UE 1106 is multiplied by itself using a multiplier 1362 to compute its square B2 1364. A product M 1368 is computed by multiplying B2 1364 with H 806 using a multiplier 1366. The M 1368 is shown in Eq. 17 by using the simplifications shown in Eq. 13 and 14 for B2*H:

$$M\ 1368 = B^2 * H = R2 * R4 \qquad \text{Eq. 17}$$

A multiplier 1354 multiplies R2 718 with R4 804 to compute a product L 1374. A comparator 1356 determines whether M 1368 is equal to L 1374 and the status of comparison is stored in a flag PredFlag2 1372.

$$L\ 1374 = R2 * R4 \qquad \text{Eq. 18}$$

A comparator module 1360 compares whether the known public identity KPR-1 612 of the receiver stored in the memory module of the sender UE 102 is equal to the known public identity KPR-2 714 of the receiver stored in the memory module of the receiver UE 1106. The status of the comparison is stored as a flag PredFlag1 1370. Both flags PredFlag1 1370 and PredFlag2 1372 are multiplied using a multiplier 1358 to produce PredFlag3 1312. If PredFlag3 1312 is true then the receiver UE 1106 is authenticated and the transformed partial secret of the sender UE 102 is sent to the receiver UE 1106.

Figure 14:
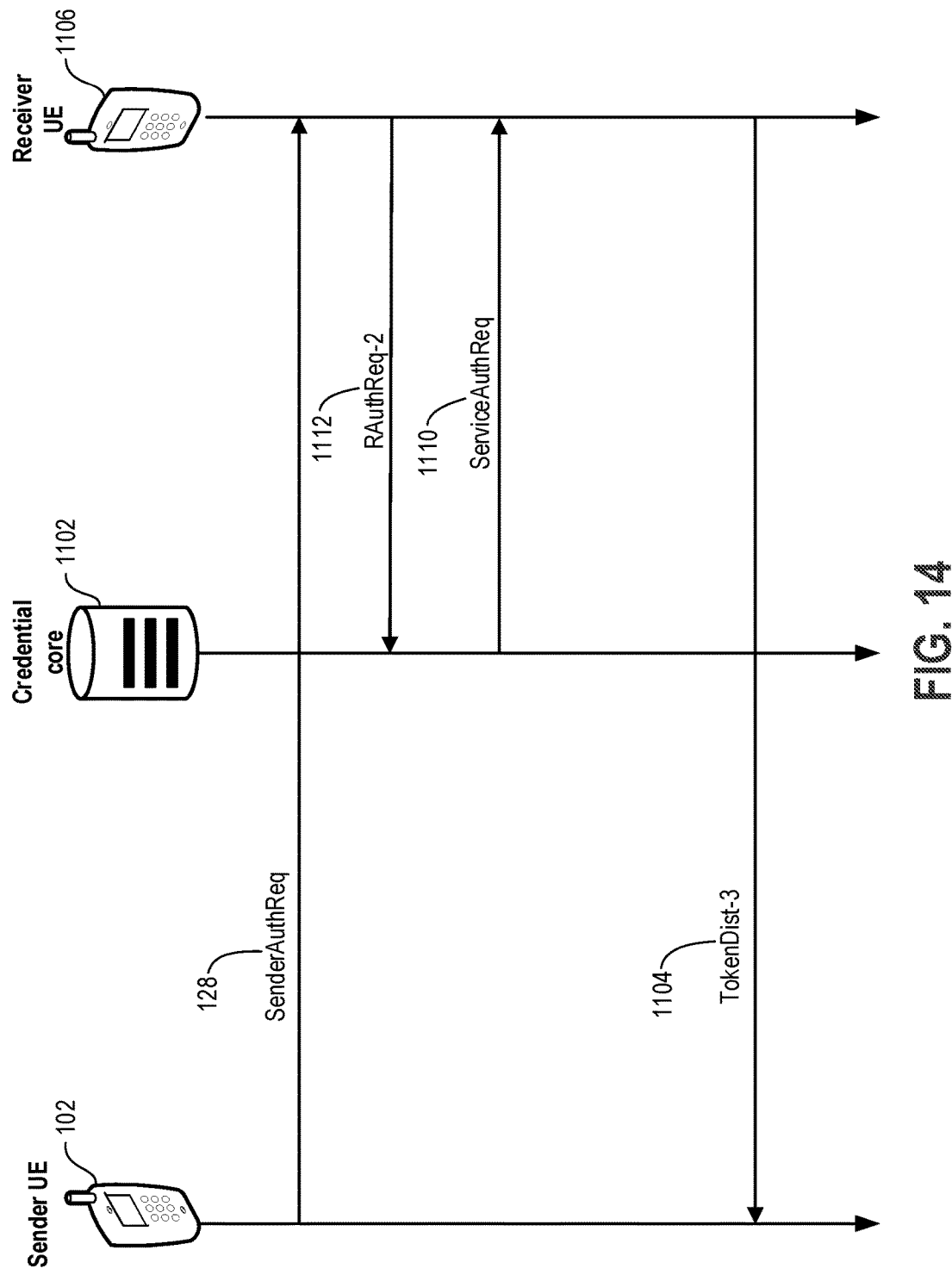
FIG. 14 is a schematic that illustrates a protocol ladder diagram in which a receiver UE authenticates a sender UE, in accordance with at least one example.

FIG. 14 is a schematic that illustrates a protocol ladder diagram showing the flow and order of messages in an authentication protocol, wherein the receiver UE 1106 is responsible for authenticating the sender UE 102 to check whether the second partial secrets of the sender UE 102 and the receiver UE 1106, stored in the database storage system 1108, are the correct mathematical transformations of the first partial secrets of the sender UE 102 and the receiver UE 1106 stored in a secure location on the UEs, in accordance with at least one example. The authentication system consists of at least two or more user equipment and a credential core 1102. The sender UE 102 generates SenderAuthReq message 128 and sends it to the receiver UE 1106. The receiver UE 1106 processes the SenderAuthReq message 128, and generates a receiver authentication request RAuthReq-2 message 1112 and sends it to the credential core 1102. The credential core 1102 verifies the correctness of the second partial secrets of receiver UE 1106, stored in the database storage system 1108, by comparing it with the corresponding first partial secrets received in RAuthReq-2 1112 of the receiver UE 1106. Finally, the credential core 1102 retrieves the transformed partial secret of the sender UE 102 from the database storage system 1108 encapsulates it in a ServiceAuthReq message 1110. The receiver UE 1106 runs the authentication service on the device and the status of the authentication process is stored in a token TokenDist-3 1104 and sent to the sender UE 102.

Figure 15:
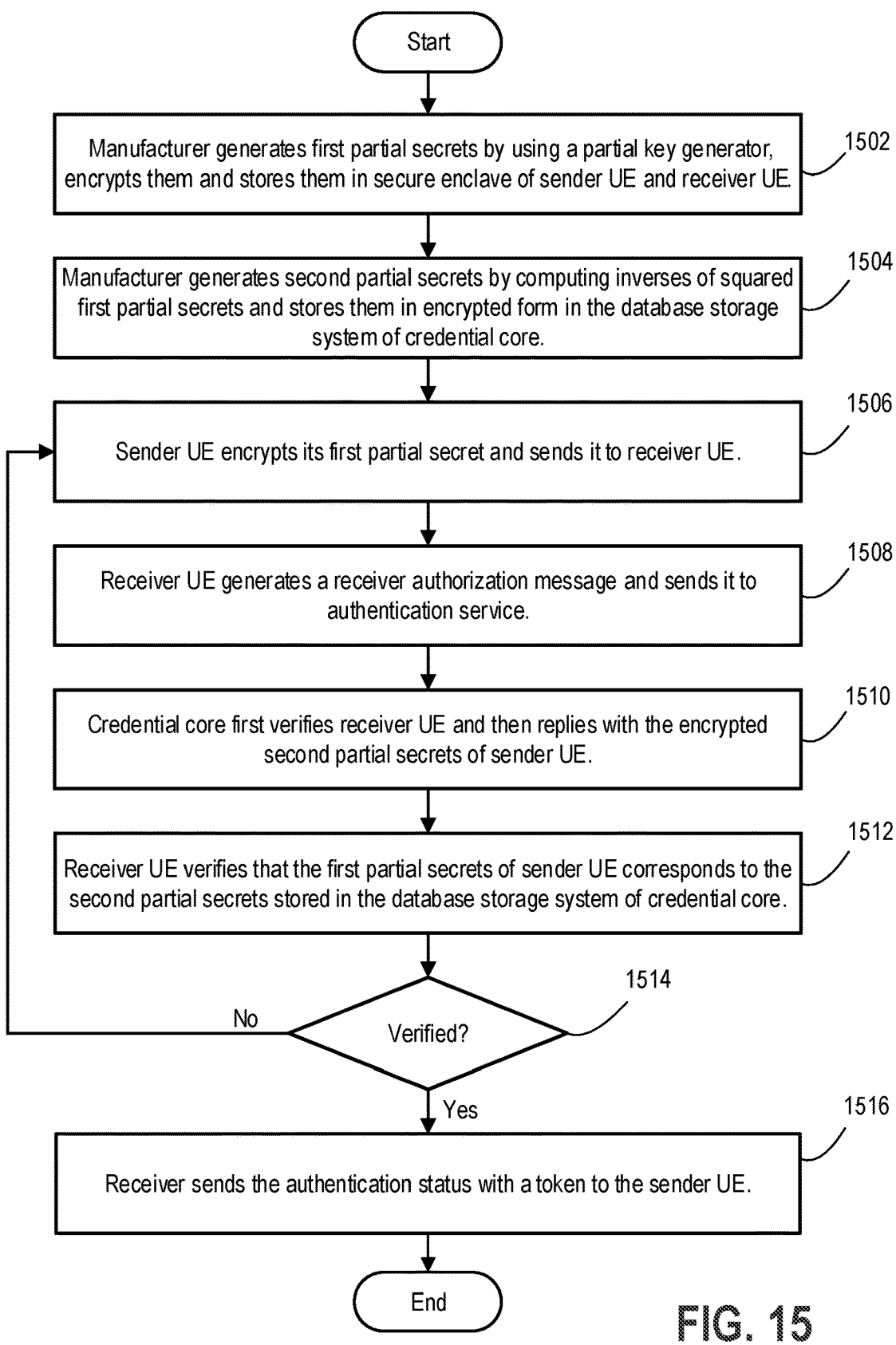
FIG. 15 is a flowchart of a protocol followed by a receiver UE to authenticate a sender UE, in accordance with at least one example.

FIG. 15 is a flowchart that illustrates an example authentication protocol to outline different operations performed by different devices, wherein the receiver UE 1106 authenticates the sender UE 102. The receiver authentication service module 1202 determines whether the second partial secret, stored in the credential core 1102, is a correct mathematical transformation of the first partial secret. In at least one example, at box 1502, a manufacturer module 302 generates the first partial secrets for the sender UE 102 and the receiver UE 1106 using partial key generator module 202. The partial key generator module 202 executes a secure key derivative function, encrypts the first partial secrets, and stores them in the secure enclaves of the sender and receiver UEs respectively. At box 1504, the multiplicative inverse of the squared first partial secrets are computed to generate second partial secrets by manufacturer module 302 for the credential core 1102. At box 1506, the sender UE 102 encrypts its first partial secret and scrambles it before sending to the receiver UE 1106. At box 1508, the receiver UE 1106 generates a receiver authentication request RAuthReq-2 message 1112, which contains information elements of the sender UE 102 and receiver UE 1106. The RAuthReq-2 message 1112 is scrambled by the receiver UE 1106 and sent to the credential core 1102. At box 1510, the credential core 1102 replies with the encrypted transformed partial secret of the sender UE 102. At box 1512, the receiver UE 1106 verifies whether the second partial secret of the sender UE 102, received from the credential core, is a correct mathematical transformation of the first partial secret of the sender UE 102. At decision box 1514, if the verification step succeeds, then at box 1516, the receiver UE 1106 sends an authentication status with a token to the sender UE 102. If the verification step fails at box 1514, then the protocol restarts at box 1506 to make the second attempt of a predefined number of attempts.

Different examples of the receiver UE, sender UE, authentication service, credential core, authentication system and associated protocols disclosed in the above description are provided such that an unauthorized UE, as a rogue entity, cannot impersonate as an authorized UE by simply wiretapping the channel in a network system, capturing the messages, and then running computations to trick an authentication service into authentication. Moreover, it is also shown that even if the rogue entity compromises the database storage system containing access credentials of UEs, wherein the database is hosted in a cloud or connected to the credential core, it is still unable to impersonate as a legitimate UE.

In the first example of FIG. 1, when an authentication process is executed by an authentication service running on a server in a cloud or in a credential core, the rogue entity can get SenderAuthReq message 128, ReceiverAuthReq message 130 and the authentication tokens TokenDist-1 132 and TokenDist-2 134 by wiretapping the communication channel. First SenderAuthReq message 128 is sent on the channel by the sender UE 102 as a sender authorization request message to the receiver UE 106. In at least one example, SenderAuthReq message 128 is scrambled by the randomizer module 616 before transmission. The rogue entity cannot extract the information elements comprising KPS 610, KPR-1 612, R1 622, and A 626, because this demands the knowledge of the internal state configurations of the randomizer module 616. The rogue entity could not access the internal state configurations of any randomizer module by simply wiretapping the communication channel. For the sake of argument, assume the rogue entity unscrambles SenderAuthReq message 128 and recovers information elements KPS 610, KPR-1 612, R1 622, and A 626. The known public identity of the sender UE 102 is KPS 610 and the known public identity of the receiver UE 106 stored in the memory module of the sender UE 102 is KPR-1 612. Though these identities are included in SenderAuthReq message 128, but they are generally known publicly and hence not a big concern. R1 622, being the quadratic residue of a random number r1 606, maintains its confidentiality because of the QR encryption method. A 626 is equal to r1*AK1 mod n from Eq. 03. The rogue entity needs the multiplicative inverse of r1 606 to recover AK1 mod n 230 from A 626. But r1 606 itself is never transmitted rather R1 622 is sent on the communication channel but it is the quadratic residue of r1 606 and hence secure, owing to the QR encryption method. Consequently, the rogue entity cannot recover r1 606, and without r1 606 the rogue entity may not be able to recover first partial secret AK1 mod n 230 of the sender UE 102 that is stored in the secure enclave 602 of the sender UE 102.

The receiver UE 106 receives SenderAuthReq message 128 and generates ReceiverAuthReq message 130, which is sent on the communication channel to the authentication service module 104. Authentication service module 104 receives ReceiverAuthReq message 130 and processes it. The rogue entity will have access to the ReceiverAuthReq message 130 because of the wiretapping capability. The ReceiverAuthReq message 130 is also scrambled by a randomizer module 726. The rogue entity, therefore, will not be able to recover information elements from the ReceiverAuthReq message 130 because it requires access to the internal state configurations of the randomizer module 726, and the wiretapping capability does not provide access to internal state configurations of a module. For the sake of argument, even if the rogue entity unscrambles ReceiverAuthReq message 130 to recover information elements in ReceiverAuthReq message 130 comprising SenderAuthReq message 128, KPR-2 714, R2 718, and B 720. From SenderAuthReq message 128, the rogue entity cannot recover sensitive information, as it is scrambled by the randomizer 616. KPR-2 714 is again a publicly known identity of the receiver UE 106 and hence not sensitive. R2 718 is the quadratic residue of a random number r2 706 and owing to the QR encryption method, it is not possible to recover r2 706 from R2 718. B 720 is r2*AK2 mod n from Eq. 06. The rogue entity needs the multiplicative inverse of r2 706 to recover AK2 mod n 126. But r2 706 itself is never transmitted on the channel, rather it's quadratic residue R2 718 is sent on the channel; therefore, it is not computationally feasible to recover random number r2 706 from R2 718. Using the same properties of the authentication system and associated protocol, a rogue entity cannot recover the sensitive information elements from ReceiverAuthReq message 130 that are required for impersonating an authorized UE.

The authentication service module 104 sends authentication tokens TokenDist-1 132 and TokenDist-2 134 to inform the sender UE 102 and receiver UE 106 about the status of authentication of the sender UE 102. These tokens are sent on the channel and hence are available to the rogue entity. Both tokens, TokenDist-1 132 and TokenDist-2 134, are also scrambled by randomizer module 836 and randomizer module 834 respectively; therefore, it is not possible for the rogue entity to recover sensitive information from these tokens, as by wiretapping the channel the rogue entity does not get access to the internal state configurations of a randomizer. For the sake of argument, tokens only contain the authentication status and hence, unscrambling the tokens would not leak sensitive information elements need to impersonate an authorized UE.

In this attack example, the rogue entity is enhanced, such that he has breached the database storage system in a cloud or in a credential core and hence has full access to the access credentials of the UEs. The second partial secret of the sender UE 102 is VK1 mod n 232 and of the receiver UE 106 is VK2 mod n. Manufacturer module 302 encrypts the second partial secret to generate encrypted second partial secret G 314. Manufacturer module 302 concatenates G 314 with the square of a random number R3 310. {G 314, R 310} is scrambled by a randomizer module 318 to generated scrambled TransSec-1 320 for the sender UE 102. Similarly, the manufacturer module 302 concatenates H 806 with the square of a random number R4 804 for the receiver UE 106 and the randomizer module 318 scrambles the concatenated message to generate TransSec-2 846 for the receiver UE 106. The TransSec-1 844 and TransSec-2 846 message are sent to the authentication service 104 that stores it in the database storage system 108 along with IV1 118 and IV2 124 respectively against the known public identities of the UEs. Now by compromising access credentials in the database storage system 108, the rogue entity gets TransSec-1 844, TransSec-2 846, IV1 118, and IV2 124. Here IV1 118 and IV2 124 are the initial vectors for the randomizers of sender UE 102 and receiver UE 106 respectively. By getting access to the initial vectors only, the rogue entity will still not be able to create synchronized randomizers because of inaccessibility to other internal configurations of randomizers like p 418 and Prev_out 416. Moreover, TransSec-1 844 and TransSec-2 846 are scrambled and hence secure for the reasons mentioned about the security of randomizers. For the sake of the argument, if the rogue entity unscrambles TransSec-1 844 and TransSec-2 846 and recovers information elements G 314, R3 310, H 806, R4 804. R3 310 and R4 804 are the quadratic residues of random numbers r3 306 and r4 respectively. The G 314 and H 806 are encrypted by multiplying with the random numbers that are never sent on the communication channel, rather their quadratic residues are sent. Therefore, the rogue entity will not be able to recover partial secrets VK1 mod n 232 and VK2 mod n by compromising the storage database system 108 of access credentials to impersonate an authorized UE.

Now in the other examples where the receiver UE 1106 runs the authentication process; an additional message is sent on the channel by the credential core 1102 in response to the RAuthReq-2 message 1112 of receiver UE 1106. The concatenated ServiceAuthReq message 1110 is also randomized and hence protected. For the sake of argument, if the rogue entity unscrambles the message and recovers information elements R3 310 and G 314. R3 310 is the quadratic residue of the random number r3 306 and hence secure. Similarly, from G 314, the rogue entity cannot recover the partial secret VK1 mod n 232 and therefore cannot recover AK1 mod n 230. So, a rogue entity cannot impersonate as an authorized UE even when the authentication process is run by the receiver UE 1106.

Now if the rogue entity breached the database in the credential core and gets full access to the access credentials of the UEs and other messages transmitted on the communication channel, the rogue entity cannot run or impersonate as an unauthorized authentication service. TransSec-1 844 and TransSec-2 846, that the rouge entity stole, are encrypted partial secret and the quadratic residue scrambled by randomizer module and hence secure. Therefore, the rogue entity will not be able to recover sensitive information elements to impersonate the authentication service 104.

Here, "concatenation module" may generally refer to a hardware component or a software component that is capable to merge the multiple bit strings of information elements. Its usage indicates the capability to combine disparate components with or without enforcing a specific order or sequence. This module allows for flexible merging of elements, allowing different configurations with or without mandating a predefined structure. The concatenation modules used in varying examples as explained in the detailed description may be implemented using the same method or by using different methods.

Here, "randomizer module" or "de-randomizer module" may generally refer to a software or hardware component that scrambles the given input. Randomizer module can include one or more linear feedback shift registers circuitries to scramble the information elements. De-randomizer module may generally refer to a software or hardware component to unscramble the input and reverse the scrambling done by the randomizer module.

Here, "XOR" operator may generally refer to a software or hardware component that can perform XOR operation on multiple inputs.

Here, "multiplier module" may generally refer to a software or hardware component that can multiply a number from the one or more information elements with a number to encrypt the one or more elements, or the multiplier multiplies numbers contained in the one or more information elements to generate an encrypted bits string.

Here, "comparator module" may generally refer to a software or hardware component that concludes whether the first input on the first input line is equal to the second input on the second input line. The output of comparator is a flag that contains either one or zero based on the outcome of the comparison.

Here, "bits splitter module" may generally refer to a software or hardware component that can separate individual bit strings of information elements that are concatenated in a received message.

Here, "mod n module" may generally refer to a software or hardware component that converts a number into a modulus n numbering system.

Here, "TRNG/PRNG module" may generally refer to a software or hardware component that can generate true random numbers or pseudo random numbers.

Here, "token generator module" may generally refer to a software or hardware component that can generate a token that a receiver UE may use to track the authentication status of a sender UE.

Here, "memory module" may generally refer to a software or hardware component that can retain information stored in it.

Here, "secure enclave module" may generally refer to a hardware component that is secure and the first partial secrets of the UEs are stored in it.

Here, "partial key generator module" may generally refer to a software or hardware component that can generate a first partial secret for a UE using a standard key derivation function.

Here, "first partial secret" may generally refer to an output of a key derivation function in the modulus n numbering system having the length in bits given at an input of the key derivation function.

Here, "second partial secret" may generally refer to a secret that is the multiplicative inverse of the square of the first partial secret.

Here, "encrypted first partial secret" may generally refer to the encrypted first partial secret computed by encrypting the first partial secret in the modulus n numbering system.

Here, "encrypted second partial secret" may generally refer to the encrypted second partial secret computed by encrypting the second partial secret in the modulus n numbering system.

Here, "transformed partial secret" may generally refer to the scrambled second partial secret, stored in a database storage system in a cloud or a credential core.

Here, "UE or user equipment" may generally refer to an apparatus according to the context of usage of that term. In at least one example, a UE may refer to a mobile device, smart phone, tablet, laptop, a stationed device, an IoT device, or any communicating or computing device.

Here, "information elements" may generally refer to one or more first partial secrets, one or more second partial secrets, one or more encrypted first partial secrets, one or more encrypted second partial secrets, quadratic residue of random numbers, product of numbers, the known public identities of the UEs, concatenation of one or more information bit strings.

Here, "communication channel" may generally refer to a wired, wireless, or any other logical communication channel between two or more devices or between modules embedded within a single equipment as known to ones skilled in the art.

Here, "known public identity of a UE" may generally refer to its IP address, MAC address or other known public identity that uniquely identifies the UE.

Here, "flag" may generally refer to a one-bit Boolean variable to store the success or failure status of the authentication process.

Here, "credential core" may generally refer to a service running in the cloud that enables a receiver UE to run the authentication process on the hardware of the receiver UE to authenticate a sender UE.

Throughout the specification, and in claims, "transmit" or "send" may generally refer to transmission of information over a wireless or a wired channel, or any other communication mode between two or more devices or between modules embedded within a single equipment as known to ones skilled in the art.

Here, "module" may generally refer to one or more passive and/or active components that are arranged to cooperate with one another to provide a desired function.

Here, "{X, Y}" may generally refer to the concatenation of two information elements X and Y that are present within these brackets.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

For purposes of present disclosure, phrases "A and/or B" and "A or B" mean (A), (B), or (A and B). In at least one example, phrase "A, B, and/or C" means (A), (B), (C), (A and B), (A and C), (B and C), or (A, B and C).

Reference in specification to "an example," "one example," "in at least one example," "some examples," or "other examples" means that a particular feature, structure, or characteristic described in connection with examples is included in some examples. Various appearances of "an example," "one example," "in at least one example," or "some examples" are not necessarily all referring to the same examples. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Example 1 is an apparatus of a receiver User Equipment (UE) acting as an end point of a communication channel to receive incoming messages on the communication channel, the apparatus comprising: a memory module including a value of a composite number n, a known public identity of the receiver UE, and an authentication status token of a sender UE, wherein: the composite number n is a product of two prime numbers; the composite number n is applied for computing mathematical operations in a modulus n numbering system; and the authentication status determines whether the sender UE is successfully authenticated; a secure enclave to store a first partial secret of the receiver UE, wherein the first partial secret is generated in the modulus n numbering system by a manufacturer module of an entity that manufactured the receiver UE or the entity is an owner of the receiver UE; a first random number generator module to generate a first random number; a first encryption module that applies the first random number to encrypt the first partial secret and generate an encrypted first partial secret; a first modulo n module that converts the encrypted first partial secret in the modulus n numbering system; a second encryption module that computes a square of the first random number by multiplying the first random number with itself, wherein the first modulo n module converts the square of the first random number into the modulus n numbering system; a first concatenation module to merge multiple bit strings of information elements comprising: the encrypted first partial secret; the known public identity of the receiver UE stored in the memory module of the receiver UE; the square of the first random number in the modulus n numbering system produced by the second encryption module; and a sender authorization request message received by the receiver UE on the communication channel, wherein the sender authorization request message is sent by the sender UE, wherein the multiple bit strings of information elements are merged into a receiver authorization request message; and a first randomizer module to scramble the receiver authorization request message before transmission on the communication channel.

Example 2 is an apparatus according to any examples herein, in particular example 1, wherein the manufacturer module of the entity that manufactured the receiver UE is an owner entity of the receiver UE, wherein the manufacturer module includes: a partial key generator module that generates the first partial secret for the receiver UE, wherein the partial key generator includes: a first random number generator module to generate a plurality of random numbers such that two random numbers that are prime numbers are selected and multiplied to form a composite number n, wherein the composite number n is applied for computing mathematical operations in the modulus n numbering system; a key derivation function taking inputs comprising: a random number from the plurality of random numbers to act as a salt; a length in bits of the first partial secret; and a known public identity of the receiver UE, wherein the key derivation function produces an output comprising the first partial secret having the length in bits given at an input of the key derivation function; a second modulo n module that converts the first partial secret into the modulus n numbering system; a multiplicative inverse module that computes a second partial secret by computing a square of the first partial secret by multiplying the first partial secret with itself, and then computing a multiplicative inverse of the square of the first partial secret in the modulus n numbering system, wherein the multiplicative inverse of the square of the first partial secret in the modulus n numbering system is the second partial secret; a second random number generator module to generate a second random number; a third encryption module that computes a square of the second random number by multiplying the second random number with itself; a third modulo n module that converts the square of the second random number into the modulus n numbering system; a fourth encryption module that applies the square of the second random number to encrypt the second partial secret, wherein the third modulo n module converts the encrypted second partial secret into the modulus n numbering system; a second concatenation module to merge the multiple bit strings of information elements into a transformed partial secret message of the receiver UE comprising: the encrypted second partial secret in the modulus n numbering system of the receiver UE; and the square of the second random number in the modulus n numbering system generated by the manufacturer module of the receiver UE; and a second randomizer module to scramble the transformed partial secret message of the receiver UE before transmission on the communication channel.

Example 3 is an apparatus according to any examples herein, in particular example 2, wherein the first encryption module and the second encryption module of the receiver UE, and the third encryption module or the fourth encryption module of the manufacturer module of receiver UE are configured to execute a quadratic residue encryption method.

Example 4 is an apparatus according to any examples herein, in particular example 1, wherein the first randomizer module includes one or more linear frequency shift register circuitries to scramble the information elements.

Example 5 is an apparatus according to any examples herein, in particular example 1, wherein the receiver UE includes a receiver authentication service module to run an authentication service at the receiver UE to authenticate the sender UE, the receiver authentication service module includes: a first bits splitter module to separate individual bit strings of information elements in the receiver authorization request message which is unscrambled, wherein the information elements in the unscrambled receiver authentication message comprise: the encrypted first partial secret of the receiver UE; the known public identity of the receiver UE stored in the memory module of the sender UE; the square of the first random number in the modulus n numbering system produced by the second encryption module of the receiver UE; and the sender authorization request message received on the communication channel by the receiver UE, wherein the sender authorization request message is sent by the sender UE; a first de-randomizer module to unscramble the sender authorization request message sent by the sender UE, wherein the unscrambled sender authorization request message is a concatenation of information elements comprising: a known public identity of the sender UE stored in the memory module of the sender UE; a known public identity of the receiver UE stored in the memory module of the sender UE; a square of a first random number in the modulus n numbering system produced by the second encryption module of the sender UE; and an encrypted first partial secret of the sender UE in the modulus n numbering system; a second bits splitter module to separate individual bit strings of information elements in the unscrambled sender authorization request message; a first multiplier to compute a first square of the encrypted first partial secret of the sender UE by multiplying the encrypted first partial secret of the sender UE with itself; a first concatenation module to concatenate receiver information elements comprising: a known public identity of the receiver UE stored in the memory module of the receiver UE; the encrypted first partial secret of the receiver UE; and the square of the first random number in the modulus n numbering system produced by the second encryption module of the receiver UE; wherein the concatenated receiver information elements generate a receiver authentication service message; a first randomizer module to scramble the receiver authentication service message before transmitting it on the communication channel via the receiver UE to a credential core in a cloud; a second de-randomizer module that unscrambles a service authorization request message sent by a credential core in a cloud, wherein the unscrambled service authorization request message comprises: the encrypted second partial secret of the sender UE in the modulus n numbering system generated by a manufacturer module of the sender UE; and the square of a second random number in the modulus n numbering system generated by the manufacturer module of the sender UE; a second bits splitter module to separate the individual bit strings of information elements in the unscrambled service authorization request message; a second multiplier computes a second product by multiplying the first square computed by the first multiplier with the encrypted second partial secret of the sender UE in the modulus n numbering system generated by the manufacturer module of the sender UE; a third multiplier computes a third product by multiplying the square of a second random number in the modulus n numbering system generated by the manufacturer module of the sender UE with the square of a first random number in the modulus n numbering system generated by a second encryption module of the sender UE; a comparator module to determine whether the second product is equal to the third product, wherein the comparator module outputs a status in a flag; a token generator module generates a first authentication token; a second concatenation module concatenates the first authentication token with the flag of the comparator module to generate a second authentication token; a second randomizer module scrambles the second authentication token, wherein the receiver authentication service module sends the scrambled second authentication token to the sender UE via the receiver UE.

Example 6 is an apparatus according to any examples herein, in particular example 5, wherein a credential core apparatus in a cloud is communicatively coupled with the receiver authentication service module, the credential core apparatus includes: a first de-randomizer module to unscramble the receiver authentication service message sent by the receiver UE module on the communication channel, wherein the unscrambled receiver authentication service message comprises of information elements: the known public identity of the receiver UE stored in the memory module of the receiver UE; the known public identity of the sender UE stored in the memory module of the sender UE; the known public identity of the receiver UE stored in the memory module of the sender UE; the encrypted first partial secret of the receiver UE; and the square of the first random number in the modulus n numbering system produced by the second encryption module of the receiver UE; a first bits splitter module to separate the individual bit strings of information elements in the unscrambled receiver authentication service message; a persistent storage database, wherein the known public identity of the sender UE stored in the memory module of the sender UE is used to index into the persistent storage database to find a transformed partial secret of the sender UE, and wherein the known public identity of the receiver UE stored in the memory module of the receiver UE is used to index into the persistent storage database to find a transformed partial secret of the receiver UE; a memory module to store the known public identity of the sender UE stored in the memory module of the sender UE, the transformed partial secret of the sender UE, wherein the transformed partial secret of the sender UE is retrieved from the persistent storage database, the known public identity of the receiver UE stored in the memory module of the receiver UE, and the transformed partial secret of the receiver UE, wherein the transformed partial secret of the receiver UE is retrieved from the persistent storage database;

a user side module, wherein input information elements to the user side module comprise: the known public identity of the receiver UE stored in the memory module of the receiver UE; the known public identity of the receiver UE stored in the memory module of the sender UE; the encrypted first partial secret of the receiver UE; the square of the first random number in the modulus n numbering system produced by the second encryption module of the receiver UE; and the transformed partial secret of the receiver UE; wherein the user side module authenticates the receiver UE by applying one or mathematical operations on the input information elements, wherein a status of an authentication process is put in a flag; a first multiplier to multiply the flag of the user side module with the transformed partial secret of the sender UE to generate a service authorization message; and a randomizer module to scramble the service authorization request message before transmission on the communication channel.

Example 7 is an apparatus according to any examples herein, in particular example 6, wherein the user side module includes: a second de-randomizer to unscramble the transformed partial secret of the receiver UE, wherein the unscrambled transformed partial secret of the receiver UE comprises information elements which include: the square of a second random number generated by the manufacturer module of the receiver UE; and the encrypted second partial secret of the receiver UE generated by the manufacturer module of the receiver UE; a second bit splitter that separates the information elements in the unscrambled transformed partial secret of the receiver UE; a second multiplier to compute a second product by multiplying the square of the second random number generated by the manufacturer module of the receiver UE with the square of the first random number generated by the random number generator module of the receiver UE; a third multiplier to compute a third product, wherein the third product is a square of the encrypted first partial secret of the receiver UE, wherein the square is computed by the third multiplier by multiplying the encrypted first partial secret of the receiver UE with itself, a fourth multiplier to compute a fourth product by multiplying the third product with the encrypted second partial secret of the receiver UE; a first comparator module to determine whether the fourth product computed by the fourth multiplier is equal to the second product computed by the second module, wherein the first comparator module outputs a status in a first flag; a second comparator module to determine whether the known public identity of the receiver UE stored in the memory module of the receiver UE is equal to the known public identity of the receiver UE stored in the memory module of the sender UE, wherein the second comparator module outputs a status in a second flag; and a fifth multiplier to compute a fifth product by multiplying the first flag of the first comparator with the second flag of the second comparator, wherein the value of the fifth product is equal to 1 if the receiver UE is authenticated, wherein the value of the fifth product is equal to 0 if the receiver UE is not authenticated, wherein the fifth product is the flag of the user side module in the credential core.

Example 8 is an apparatus according to any examples herein, in particular example 6, wherein the credential core apparatus is configured to run in a distributed blockchain system.

Example 9 is an apparatus comprising: one or more circuitries to authenticate a user equipment or a device by encrypting one or more information elements based on at least one of a multiplier, a concatenation module, a bit splitter, a randomizer module, a de-randomizer module, and a comparator, wherein the multiplier multiplies a number in the one or more information elements with the number to encrypt the one or more elements or the multiplier multiplies numbers contained in the one or more information elements to generate an encrypted bits string, wherein the concatenation module concatenates elements of the one or more information elements or elements of the one or more encrypted information elements to generate a concatenated output, wherein the bit splitter separates information elements in the concatenated output, wherein the randomizer module scrambles the concatenated output or an information element of the one or more information elements, wherein the de-randomizer module unscrambles the concatenated output or an information element of the one or more information elements, and wherein the comparator compares whether a first scrambled or unscrambled information element on its first input line is equal to a second scrambled or unscrambled information element on its second input line, wherein the comparator outputs a status in a flag.

Example 10 is an apparatus according to any examples herein, in particular example 9, wherein the one or more information elements comprise: a known public identity of the user equipment or device; one or more random numbers; a square of the one or more random numbers; an encrypted first partial secret of the user equipment or device; an encrypted second partial secret of the user equipment or device; a concatenated string of the one or more information elements; a scrambled concatenated string; or one or more scrambled information elements.

Example 11 is an apparatus according to any examples herein, in particular example 9, wherein the one or more circuitries include a random number generator module to generate true random numbers or pseudo random numbers.

Example 12 is an apparatus according to any examples herein, in particular example 9, wherein the one or more circuitries include a volatile memory or a non-volatile memory.

Example 13 is an apparatus according to any examples herein, in particular example 9, wherein the apparatus is a receiver user equipment which is configured to communicate with a sender user equipment over a communication channel, wherein the sender user equipment includes a sender randomizer module, wherein the sender randomizer module on the sender user equipment is configured to run in a synchronized manner with the de-randomizer module on the receiver user equipment.

Example 14 is an apparatus of a sender User Equipment (UE) acting as an end point of a communication channel to send messages on the communication channel, the apparatus comprising: a memory module containing: a value of a composite number n, wherein the composite number n is a product of two prime numbers; the composite number n is applied for computing mathematical operations in a modulus n numbering system; a known public identity of a receiver UE; a known public identity of the sender UE; and an authentication status token of the sender UE, wherein the authentication status determines whether the sender UE is successfully authenticated; a secure enclave to store a first partial secret of the sender UE, wherein the first partial secret is generated in the modulus n system by a manufacturer module of an entity that manufactured the sender UE or the entity is an owner of the sender UE; a first random number generator module to generate a first random number; a first encryption module that applies the first random number to encrypt the first partial secret of the sender UE; a first modulo n module that converts the encrypted first partial secret in the modulus n numbering system; a second encryption module that computes a square of the first random number by multiplying the first random number with itself, wherein the first modulo n module converts the square of the first random number into the modulus n numbering system; a first concatenation module to merge multiple bit strings of information elements comprising: the known public identity of the receiver UE stored in the memory module of the sender UE; the known public identity of the sender UE stored in the memory module of the sender UE; the square of the first random number in the modulus n numbering system produced by the second encryption module of the sender UE; and the encrypted first partial secret of the sender UE in the modulus n numbering system; wherein the multiple bit strings of the information elements are merged into a sender authorization request message; and a first randomizer module to scramble the sender authorization request message before transmission on the communication channel.

Example 15 is an apparatus according to any examples herein, in particular example 14, wherein the manufacturer module of the entity that manufactured the sender UE or is an owner of the sender UE, the manufacturer module comprising: a partial key generator module that generates the first partial secret for the sender UE, the partial key generator comprising: a first random number generator module to generate a plurality of random numbers such that two random numbers that are prime numbers are selected and multiplied to form a composite number n, wherein the composite number n is used for computing mathematical operations in a modulus n numbering system; a key derivation function taking inputs comprising: a random number from the plurality of random numbers to act as a salt; a length in bits of the first partial secret; and a known public identity of the sender UE, wherein the key derivation function produces an output comprising the first partial secret having the length in bits given at an input of the key derivation function; a second modulo n module that converts the first partial secret into the modulus n numbering system; a multiplicative inverse module that computes a second partial secret by computing a square of the first partial secret by multiplying the first partial secret with itself, and then computing a multiplicative inverse of the square of the first partial secret in the modulus n numbering system, wherein the multiplicative inverse of the square of the first partial secret in the modulus n numbering system is a second partial secret; a second random number generator module to generate a second random number; a third encryption module that computes a square of the second random number by multiplying the second random number with itself; a third modulo n module that converts square of the second random number into the modulus n numbering system; a fourth encryption module that applies the square of the second random number to encrypt the second partial secret, wherein the third modulo n module converts the encrypted second partial secret into the modulus n numbering system; a second concatenation module to merge multiple bit strings of information elements into a transformed partial secret message of the sender UE comprising: the encrypted second partial secret in the modulus n numbering system of the sender UE; and the square of the second random number in the modulus n numbering system generated by the manufacturer module of the sender UE; and a second randomizer module to scramble the transformed partial secret message of the sender UE before transmission on the communication channel.

Example 16 is an apparatus according to any examples herein, in particular example 15, wherein the first encryption module and the second encryption module of the sender UE, and the third encryption module or the fourth encryption module of the manufacturer module of sender UE are configured to execute a quadratic residue encryption method.

Example 17 is an apparatus according to any examples herein, in particular example 15, wherein the first randomizer module includes one or more linear frequency shift register circuitries to scramble the information elements.

Example 18 is an apparatus of an authentication service running on an authentication server in a cloud, the apparatus comprising: a user side module to unscramble a receiver authorization request message received on a communication channel from a receiver UE to generate an unscrambled receiver authorization request message, wherein information elements in the unscrambled receiver authorization request message are separated by one or more bits splitters, wherein one or more information transformers apply mathematical operations on the information elements, wherein the information elements comprise: a first information element is a known public identity of a sender UE stored in a memory module of the sender UE; a second information element is a known public identity of the receiver UE; a third information element is a square of a product, wherein the product is computed by multiplying an encrypted first partial secret of the sender UE with an encrypted first partial secret of the receiver UE, wherein the square is computed by multiplying the product with itself; a fourth information element is a status flag of the user side module; a memory module to store information elements, wherein the information elements are retrieved by the authentication service from a persistent storage database system in a cloud system, wherein the information elements comprise: a transformed partial secret of the sender UE containing an encrypted second partial secret of the sender UE; and a transformed partial secret of the receiver UE containing an encrypted second partial secret of the receiver UE; a server side module comprising: a first de-randomizer module that unscrambles the transformed partial secret of the sender UE, wherein the unscrambled transformed partial secret of the sender UE comprises: a square of a random number generated by a manufacturer module of the sender UE; and the encrypted second partial secret of the sender UE generated by the manufacturer module of the sender UE; a first bit splitter separates information elements contained in the unscrambled transformed partial secret of the sender UE; a second de-randomizer module that unscrambles the transformed partial secret of the receiver UE, wherein the transformed partial secret of the receiver UE comprises: a square of a random number generated by a manufacturer module of the receiver UE; and the encrypted second partial secret of receiver UE generated by the manufacturer module of the receiver UE; a second bit splitter that separates the information elements contained in the unscrambled transformed partial secret of the receiver UE; one or more circuitries to authenticate the sender UE or the receiver UE based on one or more information elements given as inputs to at least one of a multiplier, a first concatenation module, a comparator, a token generator, a first randomizer module, and a second randomizer module, wherein the multiplier multiplies a number in the one or more information elements with the number to encrypt the one or more elements or the multiplier multiplies numbers contained in the one or more information elements to generate an encrypted bits string, wherein the first concatenation module concatenates elements of the one or more information elements or elements of the one or more encrypted information elements to generate a concatenated output, wherein the randomizer module scrambles the concatenated output or an information element of the one or more information elements, wherein the comparator compares whether a first scrambled or unscrambled information element on its first input is equal to a second scrambled or unscrambled information element on its second input, wherein the token generator generates a first authentication token, wherein the first concatenation module concatenates the first authentication token with an output flag of the comparator to generate a second authentication token, wherein a first randomizer module scrambles the second authentication token to produce a scrambled second authentication token, wherein the authentication service sends the scrambled second authentication token to the sender UE, and wherein a second randomizer module scrambles the second authentication token to produce a scrambled third authentication token, wherein the authentication service sends the scrambled third authentication token to the receiver UE.

Example 19 is an apparatus according to any examples herein, in particular example 18, includes a user side module communicatively coupled to the authentication service apparatus, wherein the user module includes: a first de-randomizer module that unscrambles the receiver authorization request message received from the receiver UE to generate an unscrambled receiver authorization request message, wherein the unscrambled receiver authorization request message comprises a concatenation of an encrypted first partial secret of the receiver UE, a sender authorization request message, a square of a first random number in a modulus n numbering system computed by a first encryption module of the receiver UE, and a known public identity of the receiver UE stored in the memory module of the receiver UE; a first bits splitter module that separates the unscrambled receiver authorization request message into individual bit strings of information elements, wherein the known public identity of the receiver stored in the memory module of the sender UE is a first output of the user side module; a second de-randomizer module that unscrambles the sender authorization request message contained in the unscrambled receiver authorization request message, wherein the unscrambled sender authorization request message is a concatenation of information elements comprising: a known public identity of the sender UE stored in a memory module of the sender UE; a known public identity of the receiver UE stored in a memory module of the sender UE; a square of a first random number in the modulus n numbering system computed by a second encryption module of the sender UE; and an encrypted first partial secret of the sender UE in the modulus n numbering system; a second bits splitter module to separate the individual bit strings of information elements in the unscrambled sender authorization request message, wherein the known public identity of the sender UE stored in the memory module of the sender UE is a second output of the user side module, wherein the square of the first random number in the modulus n numbering system computed by the first encryption module of the sender UE is a third output of the user module, and wherein the square of a second random number in the modulus n numbering system computed by the first encryption module of the receiver UE is a fourth output of the user side module; a first multiplier that computes a first product by multiplying an encrypted first partial secret of the sender UE with the encrypted first partial secret of the receiver UE; a second multiplier that computes a square of the first product by multiplying the first product by itself to generate a fifth output of the user side module; and a first comparator module to determine whether the known public identity of the receiver UE stored in the memory module of the receiver UE contained in the receiver authorization request message is equal to the known public identity of the receiver UE stored in the memory module of the sender UE contained in the sender authorization request message, wherein the first comparator module outputs a status in a flag as a sixth output of the user module.

Example 20 is an apparatus according to any examples herein, in particular example 18, wherein the apparatus of authentication service includes: a first multiplier that computes a first product by multiplying the information elements comprising: an encrypted second partial secret of the sender UE computed by a server side module; an encrypted second partial secret of the receiver UE computed by a server side module; and a first product computed by multiplying the encrypted first partial secret of the sender UE with the encrypted first secret of the receiver UE by a user side module; a second multiplier that computes a second product by multiplying a square of a first random number in a modulus n numbering system generated by a second encryption module of the sender UE, a square of a second random number in the modulus n numbering system generated by a second encryption module of the receiver UE, a square of the third random number generated by a manufacturer module of the sender UE, and a square of fourth random number generated by a manufacturer module of the receiver UE; a second comparator to determine whether the first product computed by the first multiplier is equal to the second product computed by the second multiplier, wherein the second comparator outputs a status in a first flag, wherein a third multiplier multiplies the first flag with a flag output of the second comparator of the user side module.

Example 21 is an apparatus according to any examples herein, in particular example 20, wherein the authentication service is configured to execute on a distributed blockchain system.

We claim:

1. An apparatus of a receiver User Equipment (UE) acting as an end point of a communication channel to receive incoming messages on the communication channel, the apparatus comprising:
a memory module including a value of a composite number n, a known public identity of the receiver UE, and an authentication status token of a sender UE, wherein:
the composite number n is a product of two prime numbers;
the composite number n is applied for computing mathematical operations in a modulus n numbering system; and
the authentication status determines whether the sender UE is successfully authenticated;
a secure enclave to store a first partial secret of the receiver UE, wherein the first partial secret is generated in the modulus n numbering system by a manufacturer module of an entity that manufactured the receiver UE or the entity is an owner of the receiver UE;
a first random number generator module to generate a first random number;
a first encryption module that applies the first random number to encrypt the first partial secret and generate an encrypted first partial secret;
a first modulo n module that converts the encrypted first partial secret in the modulus n numbering system;
a second encryption module that computes a square of the first random number by multiplying the first random number with itself, wherein the first modulo n module converts the square of the first random number into the modulus n numbering system;

a first concatenation module to merge multiple bit strings of information elements comprising:
   the encrypted first partial secret;
   the known public identity of the receiver UE stored in the memory module of the receiver UE;
   the square of the first random number in the modulus n numbering system produced by the second encryption module; and
   a sender authorization request message received by the receiver UE on the communication channel, wherein the sender authorization request message is sent by the sender UE, wherein the multiple bit strings of information elements are merged into a receiver authorization request message; and a first randomizer module to scramble the receiver authorization request message before transmission on the communication channel, wherein the first encryption module and the second encryption module are implemented as multiplication circuits configured for quadratic residue operations in the modulus n numbering system, wherein the first modulo n module is implemented as a modular arithmetic processor configured to perform modular reduction operations, and wherein the first randomizer module is implemented as linear feedback shift register circuits with cascaded D flip-flops and XOR operators configured to generate pseudorandom sequences for scrambling operations.

2. The apparatus of claim 1, wherein the manufacturer module of the entity that manufactured the receiver UE is an owner entity of the receiver UE, wherein the manufacturer module includes:

a partial key generator module that generates the first partial secret for the receiver UE, wherein the partial key generator module includes:
   a first random number generator module to generate a plurality of random numbers such that two random numbers that are prime numbers are selected and multiplied to form a composite number n, wherein the composite number n is applied for computing mathematical operations in the modulus n numbering system;
   a key derivation function taking inputs comprising:
      a random number from the plurality of random numbers to act as a salt;
      a length in bits of the first partial secret; and
      a known public identity of the receiver UE, wherein the key derivation function produces an output comprising the first partial secret having the length in bits given at an input of the key derivation function;
   a second modulo n module that converts the first partial secret into the modulus n numbering system;
   a multiplicative inverse module that computes a second partial secret by computing a square of the first partial secret by multiplying the first partial secret with itself, and then computing a multiplicative inverse of the square of the first partial secret in the modulus n numbering system, wherein the multiplicative inverse of the square of the first partial secret in the modulus n numbering system is the second partial secret;
a second random number generator module to generate a second random number;

a third encryption module that computes a square of the second random number by multiplying the second random number with itself;

a third modulo n module that converts the square of the second random number into the modulus n numbering system;

a fourth encryption module that applies the square of the second random number to encrypt the second partial secret, wherein the third modulo n module converts the encrypted second partial secret into the modulus n numbering system;

a second concatenation module to merge the multiple bit strings of information elements into a transformed partial secret message of the receiver UE comprising:
   the encrypted second partial secret in the modulus n numbering system of the receiver UE; and
   the square of the second random number in the modulus n numbering system generated by the manufacturer module of the receiver UE; and a second f module to scramble the transformed partial secret message of the receiver UE before transmission on the communication channel, wherein the partial key generator module, the multiplicative inverse module, the second modulo n module, the third modulo n module, the third encryption module, the fourth encryption module, and the second concatenation module are implemented as dedicated hardware circuitries.

3. The apparatus of claim 2, wherein the first encryption module and the second encryption module of the receiver UE, and the third encryption module or the fourth encryption module of the manufacturer module of receiver UE are configured to execute a quadratic residue encryption method, wherein the quadratic residue encryption method is executed by dedicated hardware multiplication circuitries.

4. The apparatus of claim 1, wherein the first randomizer module includes one or more linear frequency shift register circuitries to scramble the information elements, wherein the one or more linear frequency shift register circuitries are implemented as dedicated hardware shift register circuits.

5. The apparatus of claim 1, wherein the receiver UE includes a receiver authentication service module to run an authentication service at the receiver UE to authenticate the sender UE, the receiver authentication service module includes:

a first bits splitter to separate individual bit strings of information elements in the receiver authorization request message which is unscrambled, wherein the information elements in the unscrambled receiver authentication message comprise:
   the encrypted first partial secret of the receiver UE;
   the known public identity of the receiver UE stored in the memory module of the sender UE;
   the square of the first random number in the modulus n numbering system produced by the second encryption module of the receiver UE; and
   the sender authorization request message received on the communication channel by the receiver UE, wherein the sender authorization request message is sent by the sender UE;

a first de-randomizer module to unscramble the sender authorization request message sent by the sender UE, wherein the unscrambled sender authorization request message is a concatenation of information elements comprising:
   a known public identity of the sender UE stored in the memory module of the sender UE;

a known public identity of the receiver UE stored in the memory module of the sender UE;
a square of a first random number in the modulus n numbering system produced by the second encryption module of the sender UE; and
an encrypted first partial secret of the sender UE in the modulus n numbering system;
a second bits splitter module to separate individual bit strings of information elements in the unscrambled sender authorization request message;
a first multiplier to compute a first square of the encrypted first partial secret of the sender UE by multiplying the encrypted first partial secret of the sender UE with itself;
a first concatenation module to concatenate receiver information elements comprising:
a known public identity of the receiver UE stored in the memory module of the receiver UE;
the encrypted first partial secret of the receiver UE; and
the square of the first random number in the modulus n numbering system produced by the second encryption module of the receiver UE; wherein the concatenated receiver information elements generate a receiver authentication service message;
a first randomizer module to scramble the receiver authentication service message before transmitting it on the communication channel via the receiver UE to a credential core in a cloud;
a second de-randomizer module that unscrambles a service authorization request message sent by a credential core in a cloud, wherein the unscrambled service authorization request message comprises:
the encrypted second partial secret of the sender UE in the modulus n numbering system generated by a manufacturer module of the sender UE; and
the square of a second random number in the modulus n numbering system generated by the manufacturer module of the sender UE;
a second bits splitter module to separate the individual bit strings of information elements in the unscrambled service authorization request message;
a second multiplier computes a second product by multiplying the first square computed by the first multiplier with the encrypted second partial secret of the sender UE in the modulus n numbering system generated by the manufacturer module of the sender UE;
a third multiplier computes a third product by multiplying the square of a second random number in the modulus n numbering system generated by the manufacturer module of the sender UE with the square of a first random number in the modulus n numbering system generated by a second encryption module of the sender UE;
a comparator to determine whether the second product is equal to the third product, wherein the comparator outputs a status in a flag, wherein the comparator is implemented as dedicated hardware comparison circuitry that outputs binary status flags;
a token generator module generates a first authentication token;
a second concatenation module concatenates the first authentication token with the flag of the comparator to generate a second authentication token;
a second randomizer module scrambles the second authentication token, wherein the receiver authentication service module sends the scrambled second authentication token to the sender UE via the receiver UE.

6. The apparatus of claim 5, wherein a credential core apparatus in a cloud is communicatively coupled with the receiver authentication service module, the credential core apparatus includes:
a first de-randomizer module to unscramble the receiver authentication service message sent by the receiver UE module on the communication channel, wherein the unscrambled receiver authentication service message comprises of information elements:
the known public identity of the receiver UE stored in the memory module of the receiver UE;
the known public identity of the sender UE stored in the memory module of the sender UE;
the known public identity of the receiver UE stored in the memory module of the sender UE;
the encrypted first partial secret of the receiver UE; and
the square of the first random number in the modulus n numbering system produced by the second encryption module of the receiver UE;
a first bits splitter module to separate the individual bit strings of information elements in the unscrambled receiver authentication service message;
a persistent storage database, wherein the known public identity of the sender UE stored in the memory module of the sender UE is used to index into the persistent storage database to find a transformed partial secret of the sender UE, and wherein the known public identity of the receiver UE stored in the memory module of the receiver UE is used to index into the persistent storage database to find a transformed partial secret of the receiver UE;
a memory module to store the known public identity of the sender UE stored in the memory module of the sender UE, the transformed partial secret of the sender UE, wherein the transformed partial secret of the sender UE is retrieved from the persistent storage database, the known public identity of the receiver UE stored in the memory module of the receiver UE, and the transformed partial secret of the receiver UE, wherein the transformed partial secret of the receiver UE is retrieved from the persistent storage database;
a user side module, wherein input information elements to the user side module comprise:
the known public identity of the receiver UE stored in the memory module of the receiver UE;
the known public identity of the receiver UE stored in the memory module of the sender UE;
the encrypted first partial secret of the receiver UE;
the square of the first random number in the modulus n numbering system produced by the second encryption module of the receiver UE; and
the transformed partial secret of the receiver UE; wherein the user side module authenticates the receiver UE by applying one or mathematical operations on the input information elements, wherein a status of an authentication process is put in a flag;
a first multiplier to multiply the flag of the user side module with the transformed partial secret of the sender UE to generate a service authorization message; and
a randomizer module to scramble the service authorization request message before transmission on the communication channel, wherein the first de-randomizer module, first bits splitter module, user side module, first multiplier, and randomizer module are implemented as dedicated hardware circuitries.

7. The apparatus of claim 6, wherein the user side module includes:
a second de-randomizer module to unscramble the transformed partial secret of the receiver UE, wherein the unscrambled transformed partial secret of the receiver UE comprises information elements which include:
the square of a second random number generated by the manufacturer module of the receiver UE; and
the encrypted second partial secret of the receiver UE generated by the manufacturer module of the receiver UE;
a second bit splitter that separates the information elements in the unscrambled transformed partial secret of the receiver UE;
a second multiplier to compute a second product by multiplying the square of the second random number generated by the manufacturer module of the receiver UE with the square of the first random number generated by the random number generator module of the receiver UE;
a third multiplier to compute a third product, wherein the third product is a square of the encrypted first partial secret of the receiver UE, wherein the square is computed by the third multiplier by multiplying the encrypted first partial secret of the receiver UE with itself;
a fourth multiplier to compute a fourth product by multiplying the third product with the encrypted second partial secret of the receiver UE;
a first comparator module to determine whether the fourth product computed by the fourth multiplier is equal to the second product computed by the second module, wherein the first comparator module outputs a status in a first flag;
a second comparator module to determine whether the known public identity of the receiver UE stored in the memory module of the receiver UE is equal to the known public identity of the receiver UE stored in the memory module of the sender UE, wherein the second comparator module outputs a status in a second flag; and
a fifth multiplier to compute a fifth product by multiplying the first flag of the first comparator with the second flag of the second comparator, wherein the value of the fifth product is equal to 1 if the receiver UE is authenticated, wherein the value of the fifth product is equal to 0 if the receiver UE is not authenticated, wherein the fifth product is the flag of the user side module in the credential core, wherein the second de-randomizer module, second bit splitter, second multiplier, third multiplier, fourth multiplier, first comparator module, second comparator module, and fifth multiplier are implemented as dedicated hardware circuitries.

8. The apparatus of claim 6, wherein the credential core apparatus is configured to run in a distributed blockchain system, wherein the distributed blockchain system comprises specialized hardware mining circuits and consensus validation circuitries.

9. An apparatus comprising:
one or more circuitries to authenticate a user equipment or a device by encrypting one or more information elements based on at least one of a multiplier, a concatenation module, a bit splitter, a randomizer module, a de-randomizer module, and a comparator, wherein the multiplier multiplies a number in the one or more information elements with the number to encrypt the one or more elements or the multiplier multiplies numbers contained in the one or more information elements to generate an encrypted bits string, wherein the concatenation module concatenates elements of the one or more information elements or elements of the one or more encrypted information elements to generate a concatenated output, wherein the bit splitter separates information elements in the concatenated output, wherein the randomizer module scrambles the concatenated output or an information element of the one or more information elements, wherein the de-randomizer module unscrambles the concatenated output or an information element of the one or more information elements, and wherein the comparator compares whether a first scrambled or unscrambled information element on its first input line is equal to a second scrambled or unscrambled information element on its second input line, wherein the comparator outputs a status in a flag, wherein the multiplier, concatenation module, the bit splitter, the randomizer module, the de-randomizer module, and the comparator are implemented as dedicated hardware circuitries comprising multiplication circuits configured for modular arithmetic operations in a composite number n numbering system where n is a product of two prime numbers, modular arithmetic processors configured to perform modular reduction operations specific to quadratic residue encryption methods, and linear feedback shift register circuits with cascaded D flip-flops and XOR operators configured to generate cryptographically secure pseudorandom sequences for authentication scrambling operations.

10. The apparatus of claim 9, wherein the one or more information elements comprise:
a known public identity of the user equipment or device;
one or more random numbers;
a square of the one or more random numbers;
an encrypted first partial secret of the user equipment or device;
an encrypted second partial secret of the user equipment or device;
a concatenated string of the one or more information elements;
a scrambled concatenated string; or
one or more scrambled information elements.

11. The apparatus of claim 9, wherein the one or more circuitries include a random number generator to generate true random numbers or pseudo random numbers.

12. The apparatus of claim 9, wherein the one or more circuitries include a volatile memory or a non-volatile memory.

13. The apparatus of claim 9, wherein the apparatus is a receiver user equipment which is configured to communicate with a sender user equipment over a communication channel, wherein the sender user equipment includes a sender randomizer module, wherein the sender randomizer module on the sender user equipment is configured to run in a synchronized manner with the de-randomizer module on the receiver user equipment.

14. An apparatus of a sender User Equipment (UE) acting as an end point of a communication channel to send messages on the communication channel, the apparatus comprising:
a memory module containing:
a value of a composite number n, wherein the composite number n is a product of two prime numbers;

the composite number n is applied for computing mathematical operations in a modulus n numbering system;
a known public identity of a receiver UE;
a known public identity of the sender UE; and
an authentication status token of the sender UE, wherein the authentication status determines whether the sender UE is successfully authenticated;
a secure enclave to store a first partial secret of the sender UE, wherein the first partial secret is generated in the modulus n system by a manufacturer module of an entity that manufactured the sender UE or the entity is an owner of the sender UE;
a first random number generator module to generate a first random number;
a first encryption module that applies the first random number to encrypt the first partial secret of the sender UE;
a first modulo n module that converts the encrypted first partial secret in the modulus n numbering system;
a second encryption module that computes a square of the first random number by multiplying the first random number with itself, wherein the first modulo n module converts the square of the first random number into the modulus n numbering system;
a first concatenation module to merge multiple bit strings of information elements comprising:
the known public identity of the receiver UE stored in the memory module of the sender UE;
the known public identity of the sender UE stored in the memory module of the sender UE;
the square of the first random number in the modulus n numbering system produced by the second encryption module of the sender UE; and
the encrypted first partial secret of the sender UE in the modulus n numbering system; wherein the multiple bit strings of the information elements are merged into a sender authorization request message; and
a first randomizer module to scramble the sender authorization request message before transmission on the communication channel, wherein the first encryption module, the second encryption module, the first modulo n module, the first concatenation module, and the first randomizer module are implemented as dedicated hardware circuitries comprising multiplication circuits, modular arithmetic processors, and linear feedback shift register circuits with cascaded D flip-flops and XOR operators.

15. The apparatus of claim 14, wherein the manufacturer module of the entity that manufactured the sender UE or is an owner of the sender UE, the manufacturer module comprising:
a partial key generator module that generates the first partial secret for the sender UE, the partial key generator comprising:
a first random number generator module to generate a plurality of random numbers such that two random numbers that are prime numbers are selected and multiplied to form a composite number n, wherein the composite number n is used for computing mathematical operations in a modulus n numbering system;
a key derivation function taking inputs comprising:
a random number from the plurality of random numbers to act as a salt;
a length in bits of the first partial secret; and
a known public identity of the sender UE, wherein the key derivation function produces an output comprising the first partial secret having the length in bits given at an input of the key derivation function;
a second modulo n module that converts the first partial secret into the modulus n numbering system;
a multiplicative inverse module that computes a second partial secret by computing a square of the first partial secret by multiplying the first partial secret with itself, and then computing a multiplicative inverse of the square of the first partial secret in the modulus n numbering system, wherein the multiplicative inverse of the square of the first partial secret in the modulus n numbering system is a second partial secret;
a second random number generator module to generate a second random number;
a third encryption module that computes a square of the second random number by multiplying the second random number with itself;
a third modulo n module that converts square of the second random number into the modulus n numbering system;
a fourth encryption module that applies the square of the second random number to encrypt the second partial secret, wherein the third modulo n module converts the encrypted second partial secret into the modulus n numbering system;
a second concatenation module to merge multiple bit strings of information elements into a transformed partial secret message of the sender UE comprising:
the encrypted second partial secret in the modulus n numbering system of the sender UE; and
the square of the second random number in the modulus n numbering system generated by the manufacturer module of the sender UE; and
a second randomizer module to scramble the transformed partial secret message of the sender UE before transmission on the communication channel.

16. The apparatus of claim 15, wherein the first encryption module and the second encryption module of the sender UE, and the third encryption module or the fourth encryption module of the manufacturer module of sender UE are configured to execute a quadratic residue encryption method.

17. The apparatus of claim 15, wherein the first randomizer module includes one or more linear frequency shift register circuitries to scramble the information elements.

18. An apparatus of an authentication service running on an authentication server in a cloud, the apparatus comprising:
a user side module to unscramble a receiver authorization request message received on a communication channel from a receiver UE to generate an unscrambled receiver authorization request message, wherein information elements in the unscrambled receiver authorization request message are separated by one or more bits splitters, wherein one or more information transformers apply mathematical operations on the information elements, wherein the information elements comprise:
a first information element is a known public identity of a sender UE stored in a memory module of the sender UE;
a second information element is a known public identity of the receiver UE;

a third information element is a square of a product, wherein the product is computed by multiplying an encrypted first partial secret of the sender UE with an encrypted first partial secret of the receiver UE, wherein the square is computed by multiplying the product with itself;

a fourth information element is a status flag of the user side module;

a memory module to store information elements, wherein the information elements are retrieved by the authentication service from a persistent storage database system in a cloud system, wherein the information elements comprise:

a transformed partial secret of the sender UE containing an encrypted second partial secret of the sender UE; and a transformed partial secret of the receiver UE containing an encrypted second partial secret of the receiver UE;

a server side module comprising:

a first de-randomizer module that unscrambles the transformed partial secret of the sender UE, wherein the unscrambled transformed partial secret of the sender UE comprises:

a square of a random number generated by a manufacturer module of the sender UE; and the encrypted second partial secret of the sender UE generated by the manufacturer module of the sender UE;

a first bit splitter separates information elements contained in the unscrambled transformed partial secret of the sender UE;

a second de-randomizer module that unscrambles the transformed partial secret of the receiver UE, wherein the transformed partial secret of the receiver UE comprises:

a square of a random number generated by a manufacturer module of the receiver UE; and the encrypted second partial secret of receiver UE generated by the manufacturer module of the receiver UE;

a second bit splitter that separates the information elements contained in the unscrambled transformed partial secret of the receiver UE;

one or more circuitries to authenticate the sender UE or the receiver UE based on one or more information elements given as inputs to at least one of a multiplier, a first concatenation module, a comparator, a token generator, a first randomizer module, and a second randomizer module, wherein the multiplier multiplies a number in the one or more information elements with the number to encrypt the one or more elements or the multiplier multiplies numbers contained in the one or more information elements to generate an encrypted bits string, wherein the first concatenation module concatenates elements of the one or more information elements or elements of the one or more encrypted information elements to generate a concatenated output, wherein the randomizer module scrambles the concatenated output or an information element of the one or more information elements, wherein the comparator compares whether a first scrambled or unscrambled information element on its first input is equal to a second scrambled or unscrambled information element on its second input, wherein the token generator generates a first authentication token, wherein the first concatenation module concatenates the first authentication token with an output flag of the comparator to generate a second authentication token, wherein a first randomizer module scrambles the second authentication token to produce a scrambled second authentication token, wherein the authentication service sends the scrambled second authentication token to the sender UE, and wherein a second randomizer module scrambles the second authentication token to produce a scrambled third authentication token, wherein the authentication service sends the scrambled third authentication token to the receiver UE, wherein the user side module, the server side module, the first de-randomizer module, the first bit splitter, the second de-randomizer module, the second bit splitter, the multiplier, the first concatenation module, the comparator, the token generator, the first randomizer module, and the second randomizer module are implemented as dedicated hardware circuitries comprising multiplication circuits, modular arithmetic processors, and linear feedback shift register circuits with cascaded D flip-flops and XOR operators.

19. The apparatus of claim 18 which includes a user side module communicatively coupled to the authentication service apparatus, wherein the user module includes:

a first de-randomizer module that unscrambles the receiver authorization request message received from the receiver UE to generate an unscrambled receiver authorization request message, wherein the unscrambled receiver authorization request message comprises a concatenation of an encrypted first partial secret of the receiver UE, a sender authorization request message, a square of a first random number in a modulus n numbering system computed by a first encryption module of the receiver UE, and a known public identity of the receiver UE stored in the memory module of the receiver UE;

a first bits splitter module that separates the unscrambled receiver authorization request message into individual bit strings of information elements, wherein the known public identity of the receiver stored in the memory module of the sender UE is a first output of the user side module;

a second de-randomizer module that unscrambles the sender authorization request message contained in the unscrambled receiver authorization request message, wherein the unscrambled sender authorization request message is a concatenation of information elements comprising:

a known public identity of the sender UE stored in a memory module of the sender UE;

a known public identity of the receiver UE stored in a memory module of the sender UE;

a square of a first random number in the modulus n numbering system computed by a second encryption module of the sender UE; and an encrypted first partial secret of the sender UE in the modulus n numbering system;

a second bits splitter module to separate the individual bit strings of information elements in the unscrambled sender authorization request message, wherein the known public identity of the sender UE stored in the memory module of the sender UE is a second output of the user side module, wherein the square of the first random number in the modulus n numbering system computed by the first encryption module of the sender UE is a third output of the user module, and wherein the square of a second random number in the modulus n numbering system computed by the first encryption module of the receiver UE is a fourth output of the user side module;

a first multiplier that computes a first product by multiplying an encrypted first partial secret of the sender UE with the encrypted first partial secret of the receiver UE;

a second multiplier that computes a square of the first product by multiplying the first product by itself to generate a fifth output of the user side module; and a first comparator module to determine whether the known public identity of the receiver UE stored in the memory module of the receiver UE contained in the receiver authorization request message is equal to the known public identity of the receiver UE stored in the memory module of the sender UE contained in the sender authorization request message, wherein the first comparator module outputs a status in a flag as a sixth output of the user module.

20. The apparatus of claim 18, wherein the apparatus of authentication service includes:

a first multiplier that computes a first product by multiplying the information elements comprising:

an encrypted second partial secret of the sender UE computed by a server side module;

an encrypted second partial secret of the receiver UE computed by a server side module; and a first product computed by multiplying the encrypted first partial secret of the sender UE with the encrypted first secret of the receiver UE by a user side module;

a second multiplier that computes a second product by multiplying a square of a first random number in a modulus n numbering system generated by a second encryption module of the sender UE, a square of a second random number in the modulus n numbering system generated by a second encryption module of the receiver UE, a square of the third random number generated by a manufacturer module of the sender UE, and a square of fourth random number generated by a manufacturer module of the receiver UE;

a second comparator to determine whether the first product computed by the first multiplier is equal to the second product computed by the second multiplier, wherein the second comparator outputs a status in a first flag, wherein a third multiplier multiplies the first flag with a flag output of the second comparator of the user side module.

21. The apparatus of claim 20, wherein the authentication service is configured to execute on a distributed blockchain system.

* * * * *